United States Patent
Ingle et al.

(10) Patent No.: US 7,260,224 B1
(45) Date of Patent: Aug. 21, 2007

(54) AUTOMATED SECURE KEY TRANSFER

(75) Inventors: Ken L. Ingle, Bellevue, WA (US);
Kerstin Weinberg, Kirkland, WA (US);
Li-Fen Wu, Redmond, WA (US);
Renee M. Rinker, Kirkland, WA (US);
Olga B. Zvereva, Redmond, WA (US);
Nicholas D. Judge, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 835 days.

(21) Appl. No.: 10/610,313

(22) Filed: Jun. 30, 2003

(51) Int. Cl.
*H04L 9/08* (2006.01)
(52) U.S. Cl. .................................................. 380/279
(58) Field of Classification Search ................ 380/279; 705/71
See application file for complete search history.

(56) References Cited

U.S. PATENT DOCUMENTS

| | | | |
|---|---|---|---|
| 2003/0093694 A1* | 5/2003 | Medvinsky et al. | 713/201 |
| 2003/0133572 A1* | 7/2003 | Fish et al. | 380/232 |
| 2004/0039705 A1* | 2/2004 | Svancarek et al. | 705/51 |
| 2004/0128499 A1* | 7/2004 | Peterka et al. | 713/155 |

OTHER PUBLICATIONS

"Directory services open up", Thompson, J., Information Age, Jun. 2002, p. 46.
"Evolving the ASP Business Model: Web Service Provision in the Grid Era", Xu et al., Proceedings of the Second International Conference on Peer-to-Peer Computing, IEEE 2002, 8 pgs.
"Secure Access to Personalized Web Services", Barone et al., Proceedings 2001 Pacific Rim International Symposium on Dependable Computing, IEEE, Dec. 17-19, 2001, pp. 266-269.

* cited by examiner

*Primary Examiner*—Matthew B Smithers
(74) *Attorney, Agent, or Firm*—Lee & Hayes, PLLC

(57) ABSTRACT

A provisioning service datacenter provides a key transfer from a web service datacenter over a first secure channel. In certain versions, the provisioning service datacenter transmits an email having a hashed link to a partner site in response to a key request provided by the partner site. Certain roles at the partner site can respond to the email, thereby returning the hashed link to the provisioning service datacenter. Thereupon, in certain versions, the request is forwarded to a web service datacenter, and a secure channel is provided over which a key can be forwarded to the provisioning service datacenter, and thereupon to the partner site. In certain versions, the key is used to establish a second secure channel.

49 Claims, 9 Drawing Sheets

AUTOMATED SECURE KEY TRANSFER

TECHNICAL FIELD

This invention relates to security and, in particular, to key distribution.

BACKGROUND

Security forms an important aspect of network usage. Computer-generated encryption keys represent one security technique. Key distribution involves keys to be used by individuals in addition to keys to be used for companies and web sites to establish their connections to the servers that talk programmatically with the company web sites.

Keys often are distributed directly from a place of operations manually from one IT department to a "partner" site. Certain versions of partner sites are configured to establish secure communications with third-party consumers that allow the consumers to do business with that partner site. One challenge to key usage and acceptance has been key distribution in which keys are distributed to a partner site that to now has been performed largely manually. Such manual distribution includes, for example, manual generation of the key, manual insertion of the data for the key into the datacenter services, and manual transmission of the key to the partner (e.g., by courier or postal service).

This manual distribution of certain keys can result in certain problems. Incorrect keys and/or versions of keys can be sent to the wrong recipients. Delays due to transmissions and errors are frustrating to those parties involved. Additionally, key distribution processes are time-intensive and often require dedicated employees. A compromised key takes considerable time to replace. During this key replacement period, the partner remains susceptible to a large variety of attacks.

Thus, for key usage to become more accepted, improving and automating key distribution would be desirable.

SUMMARY

This disclosure relates to key transfer. In one aspect, a provisioning service datacenter automates a key transfer from a web service datacenter to a partner site that can be used to establish a first secure channel. The key can be used at the partner site to establish another channel between the partner site and a consumer.

BRIEF DESCRIPTION OF THE DRAWINGS

The same numbers are used throughout the drawings to reference like features and components.

DETAILED DESCRIPTION

Communications security allows data to be transmitted between different locations within a computer environment while hopefully making it prohibitively challenging for other parties to access, alter, or disturb the data. This disclosure describes various versions of an automated secure key distribution system that improves computer security. A computer environment that provides an automated secure key distribution system may include, for example, one or more computers, computer networks, electronic devices, personal display assistants, smartcards, cellular telephones, microprocessor-based devices, microcomputer-based devices, etc.

Security in communications can be achieved using keys. A key includes data representing a particularly large number. Based on the data size of the keys, it is challenging to decrypt or alter an encrypted message associated with one key without access to the other key of the key pair. Keys can be used to encrypt data so that it is extremely difficult for unauthorized individuals (e.g., those without access to the proper key) to access the data in a meaningful form. Keys can also be used to authenticate the identity of the sender of the encrypted data, and/or to verify that data has not been altered during transmission.

Keys may be symmetric or asymmetric. Symmetric keys are used in encryption schemes where the key used for encryption is identical to the key used for decryption. Asymmetric keys are used in encryption schemes where the key used for encryption is not identical to the key used for decryption. Asymmetric keys are typically arranged in key pairs such that one of the keys provides for communication security.

Automated Secure Key Distribution System

Figure 1:
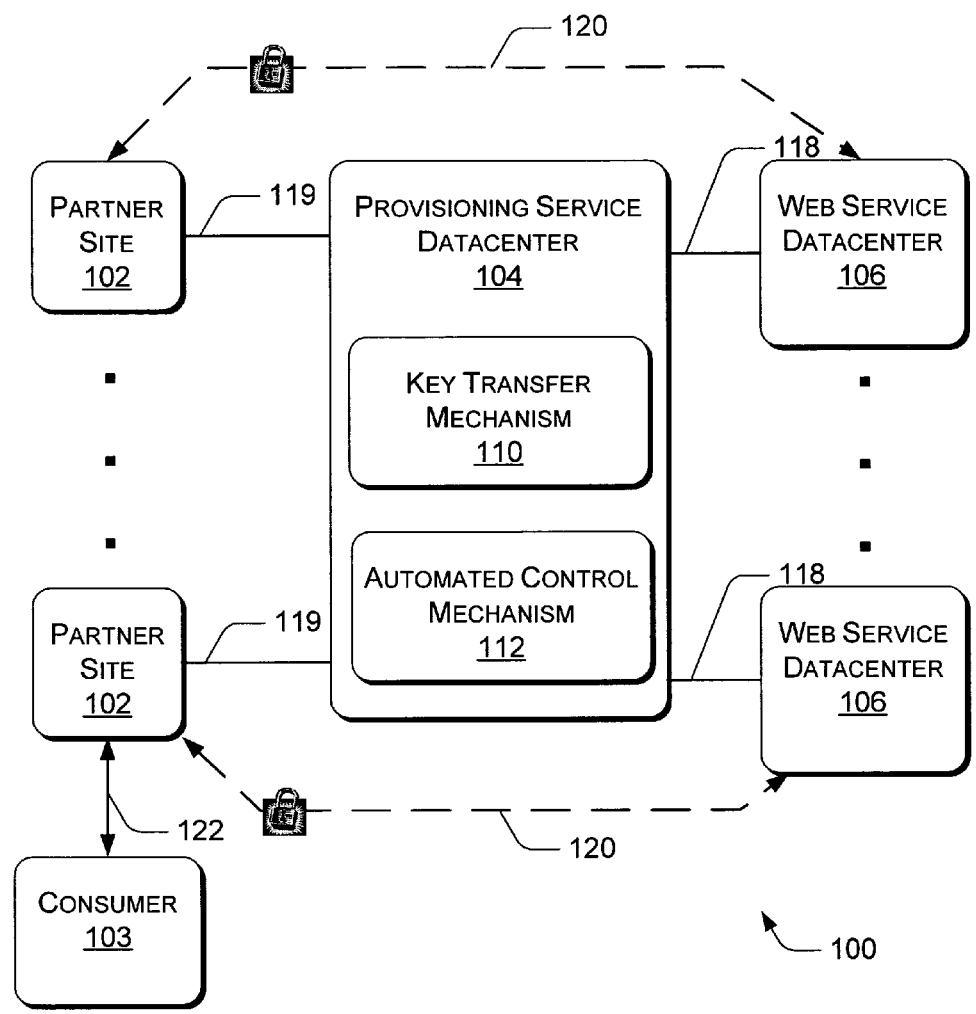
FIG. 1 is an exemplary automated secure key distribution system.

FIG. 1 shows one version of the automated secure key distribution system 100. The automated secure key distribution system 100 includes at least one partner site 102, a provisioning service datacenter 104, and at least one web service datacenter 106. One or more consumers 103 interface with the partner site 102. At least one connection 118 and at least one connection 119 are included in the automated secure key distribution system 100 of FIG. 1 that are involved in the key distribution. There are a variety of connections 120 and 122 in the automated secure key distribution system 100 that are not involved with key distribution. Each connection 118 connects one web service datacenter 106 and the provisioning service datacenter 104. Each connection 119 connects one partner site and the provisioning service datacenter 104. Each connection 120 connects one partner site 102 with one web service datacenter 106 which happens once the establishment that occurs in the remainder of the diagram happens. Each interface connection 122 connects one consumer 103 with its respective partner site 102.

In one embodiment, the partner site 102 is configured to be in contact with the provisioning service datacenter 104 via at least one connection 119 (such as provided by Secure Sockets Layer [SSL] or authentication). The partner site 102 is configured to be in contact with the web service datacenter 106 through one connection 120 in addition to through a pair of connections 118 and 119 and the provisioning service datacenter 104. The partner site 102 is in communication with the consumer 103 via interface connection 122. As such, these partner sites generate secure communication paths with the web service datacenter 106 to provide for secure authentication of consumers 103 and transmission of user profile data from the web service datacenter.

In one embodiment, the partner site 102 may be operated by and provide information relating to a particular company or entity that is in the business of doing electronic commercial transactions or secure transactions. The company or entity that operates a partner site is referred to in this disclosure as a partner. Such partners may be, for example, retail or wholesale businesses, financial institutions, government agencies, educational facilities, etc. As such, partners have an interest in conducting electronic business with a large number of consumers 103. The partner site can be run by a company or entity that performs exemplary functions such as transferring funds electronically to/from consumers 103 or transferring personally identifiable information and/or confidential information.

For illustrative purposes, the partner site 102 is configured either as a stand-alone computer (and may include a server, a mainframe, a laptop, a personal computer, or a workstation), or alternatively as a combination of networked computers. The partner site 102 has sufficient bandwidth, software, and capabilities to handle a number of consumers 103 that are associated with the partner site.

In one embodiment, the web service datacenters 106 makes one or more services available to affiliated partner sites 102. In this disclosure, the term "web service" at least one of which is provided by the web service datacenters 106, includes any network service that may be provided over the Internet or a corporate intranet using such networks as LANs, WANs, and Enterprise networks. Certain embodiments of web service datacenters 106 are associated with such web services as Microsoft® Passport, Microsoft® Alerts, and/or MSN® Wallet.

In certain embodiments, the communication process taking place involves the web service datacenter producing keys as described in this disclosure. Certain versions of web service datacenters can produce keys differently from how described in this disclosure. This disclosure is applies to a large variety of secure key transfer including those techniques that are not explicitly described in the specification, but are generally known. The web service datacenter produces keys as described in this disclosure.

The web service datacenter 106 can integrate multiple computers arranged in a networked configuration, or alternatively can include a single computer in a stand-alone configuration. The computers included in the web service datacenter 106 can functionally be configured as servers, and can structurally include personal computers, laptops, workstations, mainframes, etc. Typically, a single web service is associated with a distinct web service datacenter 106 though a web server datacenter can be shared.

After a key is transferred from the web service datacenter to the partner site using the provisioning system datacenter 104, the partner site then can interface directly with the web service datacenter. In this configuration, the web service datacenters 106 can authenticate the partner sites 102 based on a key at the web service datacenter.

The partner site 102 can install a key (e.g., a public key) on its website once it downloads the key. When a customer 103 of one of the partner sites 102 wants to authenticate to the partner site (by signing into the partner site), the partner site then contacts the web site of the web service datacenter to obtain the profile information from the web service datacenter using the key. The web service datacenter 106 then sends the profile information back to the partner site 102 using the encryption key to encrypt the actual chain of traffic traveling across the connection 120.

The partner site 102 can thereby communicate with a particular web service provided by the web service datacenter 106 over the connection 120 in the background once the key received during key distribution is enabled within the partner site. The partner site 102 does not actually physically receive the key over the connection 120 in many embodiments, it instead receives authentication and profile information which has been communicated from the web service datacenter based on the registration information and key; which was shared from the web service at the web service datacenter at the time of provisioning. The profile information is transferred to the partner site programmatically, encrypted with the encryption key.

A variety of schemes can be used in different versions of the automated secure key distribution system 100 that can include, but are not limited to: Data Encryption Standard (triple-DES), Advanced Encryption Standard (AES), Digital Signature Algorithm (DSA), elliptic curve cryptosystems, RSA (named after the algorithms inventors Rivest, Shamir, and Adleman), encryption keys, etc. The email hash-link is used in certain versions of the automated secure key distribution system as discussed herein.

Key distribution therefore can involve keys to be used by such consumers 103 as customers, individuals, and companies to establish their connections to computer servers and the like that are contained in the partner site 102 that talk programmatically with a company web site as embodied within the partner site 102.

The key can be used to encrypt/decrypt transmitted data (such as contained in cookies) so that the web service datacenters 106 and the partner site 102 can be assured of the identity of the party who sent the data, pass personally identifiable information in a secure fashion, as well as be assured that the data has not been tampered with after being sent. While the web service datacenters 106 can provide a manual key transfer to the partner site without the provisioning service datacenter 104, the use of the provisioning service datacenter acts to automate the key transfer.

Consumers 103 as described herein establish a secure communication with the partner site 102 as a result of the key download (after the key has been downloaded to the partner site 102). The consumer 103 establishes its secure channel with the partner site 102 over interface connection 122 based on the provisioning service datacenter receiving the key from the web service datacenter 106 based on a standard Secure Sockets Layer (SSL) protocol.

In certain embodiments of this disclosure, a password and user name is information which the consumer 103 passes first to the partner site 102 and, using the interface connection 120, then to the web service data center 106. These transmissions are encrypted with the key, and the key may be considered a credential that can be used to authenticate that individual. The key can be used in combination with the credential by the application of the web service datacenter 106.

In those instances that a consumer 103 wishes to conduct business with the partner site 102, a secure communication path is created between the partner site and the consumer. To provide this secure communication path between the partner site 102 and the consumer 103, the partner site 102 relies on the web service datacenter 106 to pass their information through in a secure manner, which utilizes the key.

The consumer 103 can include a computer or an electronic device. The consumer 103 could include, for example, a networked computer, a client computer and/or a server computer, a PDA, a digital telephonic device, a cellular telephone device, or the like.

In this disclosure, certain embodiments of the provisioning service datacenter 104 are used by the partner sites 102 to automate provisioning of the web services. In this disclosure, the term "provisioning" includes key transfer and registration for a web service. A large number of partner sites 102 are typically associated with many versions of provisioning service datacenters 104.

Certain embodiments of the provisioning service datacenter 104 may be viewed as a server computer that automates key distribution to provide the web services from one of a plurality of web service datacenters 106 to one of a plurality of the partner sites over a connection 120. The connection 120 is distinct (i.e., external) from the provisioning service datacenter 104.

The partner site 102 is configured to interface with the web service datacenters 106 to receive keys securely (e.g., via a secure channel) and in an automated fashion. The key transfer therefore includes establishing the secure interface connection 120 over which data is transmitted between the web service datacenter 106 and any partner site 102 through which communications are being maintained.

Certain embodiments of the key transfer are provided using the provisioning service datacenter 104 (using the interface connection 119 between the partner site 102 and the provisioning service datacenter 104, and the connection 118 between the provisioning service datacenter 104 and the web service datacenter 106). Once the key is transferred between the web service datacenter 106 and the partner site 102, then a secure communication can be established via interface connection 120 between the partner site 102 and the web service datacenter 106. The interface connection 120 is not physically connected to the provisioning service datacenter 104. In this manner, the key transfer between the partner site 102 and the web service datacenter 106 using the provisioning service datacenter 104 may be considered as establishing a secure communication over the interface connection 120 in response to the transferred key(s).

The partner site 102 can be in communication with one or more of the consumers 103 via interface connection 122. The consumers 103 can establish secure communications (e.g., a secure channel) with the partner site 102 over the interface connection 122. The secure communication over interface connection 120 may be maintained between the web service datacenter 106 and the partner site 102 simultaneous with the secure channel that is established between the partner site 102 and the consumer 103 over the interface connection 122 (even if no connection is maintained with the provisioning service datacenter 104 that established these secure communications).

Figure 2:
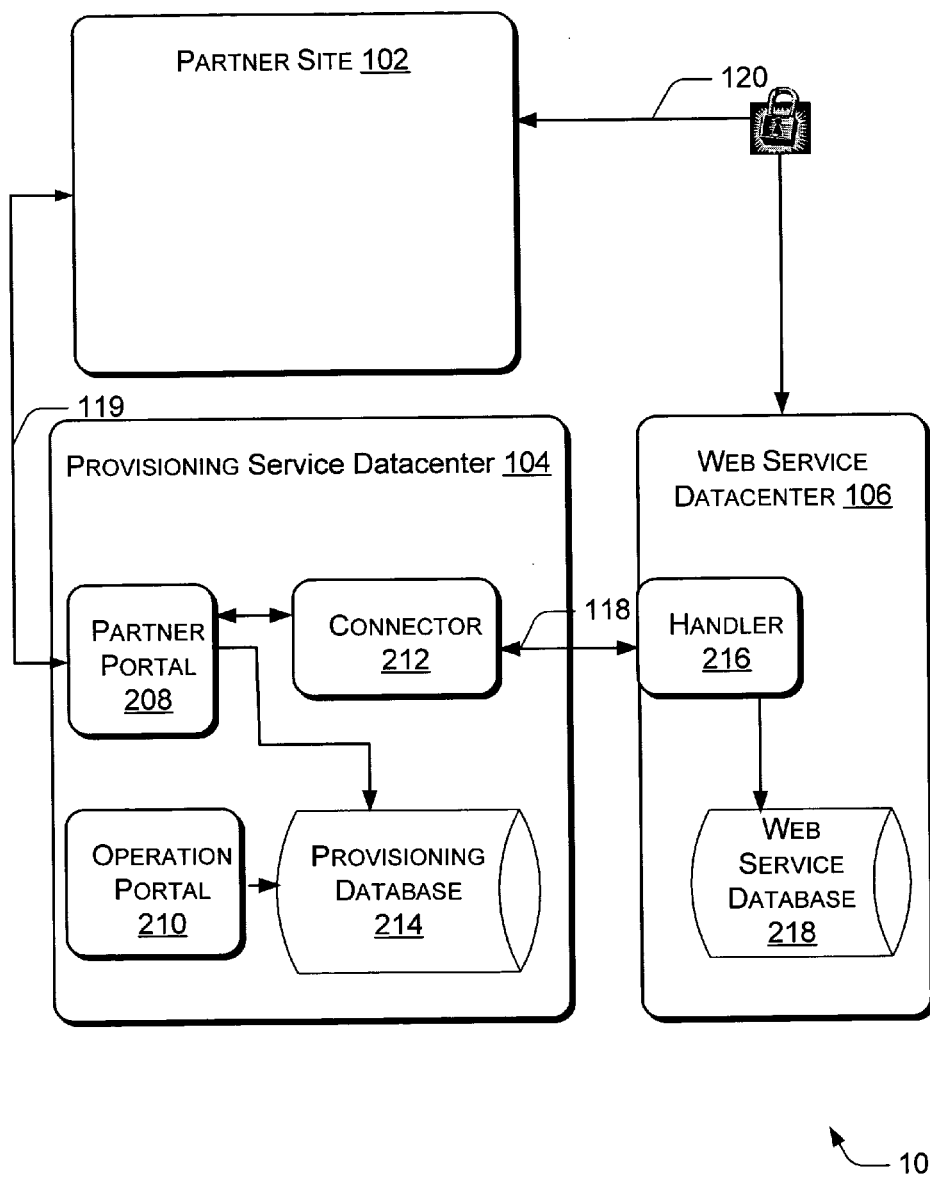
FIG. 2 is another exemplary automated secure key distribution system.

A more detailed embodiment of the automated secure key distribution system 100 is described relative to FIG. 2. The provisioning service datacenter 104 includes a partner portal 208, an operations portal 210, a connector 212, and a provisioning database 214. Throughout this disclosure, the particular component names are intended to be illustrative in nature and not limiting in scope.

In one embodiment, the partner site 102 establishes the interface connection 119 for the provisioning service datacenter 104 in a manner that automates the process of provisioning web services for partner sites 102 using one or more web service datacenters 106. The partner portal 208 collects data to be used by the web service datacenter 106 to allow a particular partner site 102 to use the technology provided by the web service datacenter 106.

In one embodiment, the operations portal 210 establishes an interface where business operations personnel may apply business operation rules to the attributes which were first entered in the partner portal 208 and contained in the provisioning database 214. The operations portal 210 represents the web site business operations use to perform business tasks. The provisioning database 214 stores information within the provisioning service datacenter 104 relating to the registration information, key request, and key transfer. The provisioning database 214 also stores information relating to other functionality of the provisioning service datacenter 104.

The web service datacenter 106 can be configured to include a handler 216 and a web service database 218. The web service database 106 contains partner information that may be input from a variety of sources including partner sites 102 and provisioning service datacenters 104. While the different embodiments of the automated secure key distribution system 100 are illustrated with specific components, these components may be interrelated within the computer environment based on the known computer operation.

Certain versions of key downloads in the automated secure key distribution system 100 depend upon an email hash-link generated from the provisioning service datacenter 104. A hash-link is a link to a file that does not link to a particular location such as an IP address, but contains a nearly-unique hash of a file to be downloaded. An email hash link is a hash link that uses email. Once a partner site 102 receives the email hash-link, it lands at a particular landing page, the landing page being configured for key download. The key download landing page thereupon goes through a security/requirement check.

Within this disclosure, the term "key management" includes, but is not limited to, downloading an existing key, registration of new companies to create partner sites, security aspects associated with the data transfer, requesting a new version of key, expiring a key, and changing the key sharing status. In one version, expiring a key relates to discontinuing usage of the key within the automated secure key distribution system 100. Keys are downloaded from the web service datacenter 106 to the partner site 102 based on a key request provided by the partner site.

Figure 3:
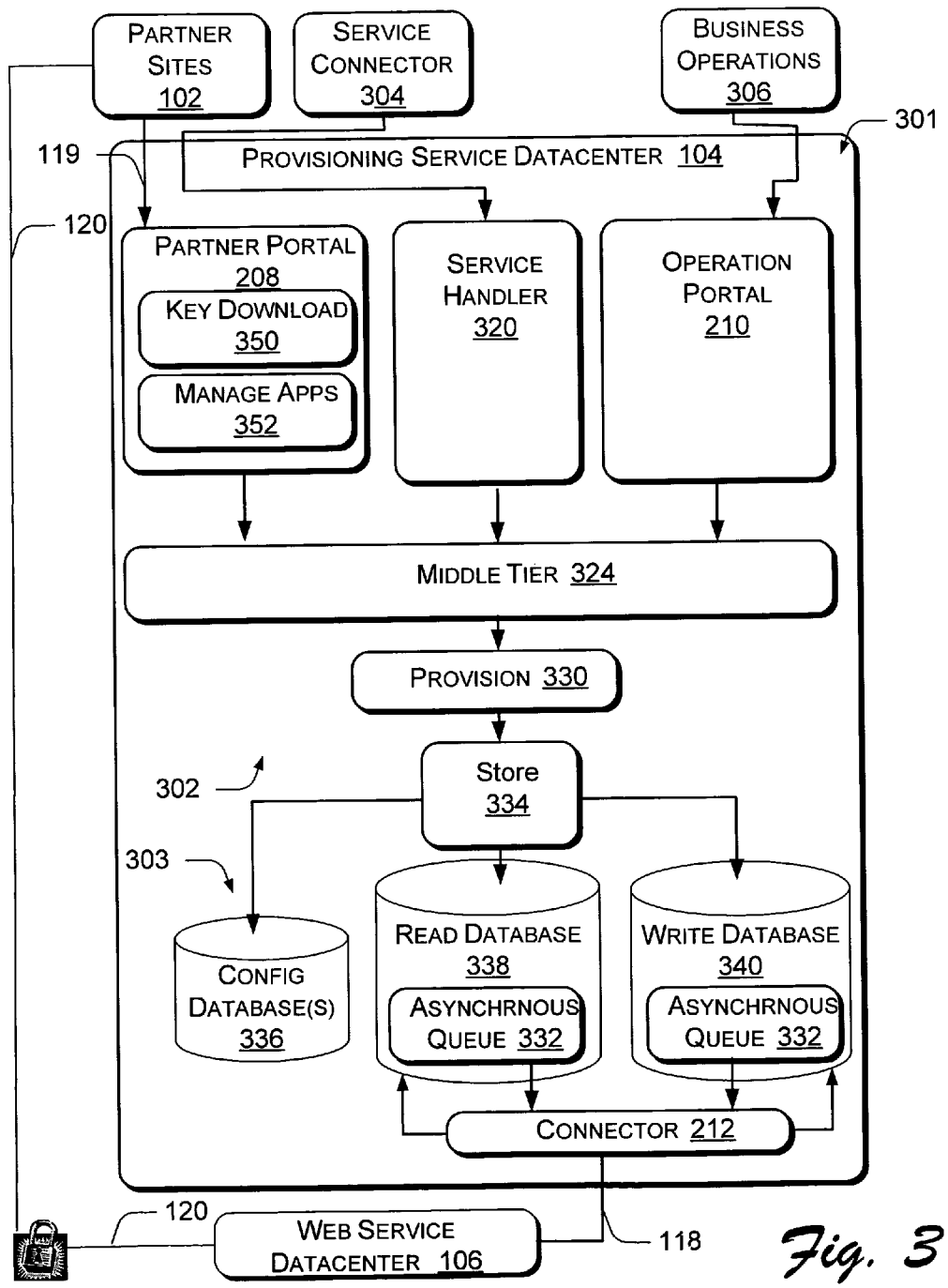
FIG. 3 is another exemplary automated secure key distribution system.

Within this disclosure, many of the concepts are applicable to one or more of FIGS. 1, 2, and 3. As such, the disclosure may alternate between components illustrated in different ones of these Figs. The reader should consider each one of FIG. 1, 2, or 3 in combination when reading this disclosure. A portion of the provisioning service datacenter 104 determines how to approve a request for a key.

As described relative to FIG. 3, one or more asynchronous queues 332 can be associated with each of the read database 338 and the write database 340 in the provisioning service datacenter 104. In versions where there are multiple asynchronous queues 332, the asynchronous queue can be divided into an operational provisioning attributes portion, a non-shared key queue portion and a shared key queue portion. One version of the asynchronous queue 332 can write data into the connector 212. The connector can provide data into the read database 338 and/or the write database 340.

To start download of a key, when an actual key download request lands at the provisioning service datacenter 104 from the partner site 102, the partner site is considered against provisioning service datacenter requirements. The partner site 102 is provided with a web server datacenter 106 key user role as described in this disclosure. A key download landing page (and a key request) then will first decrypt the key request obtained from the provisioning service datacenter 104 and check whether a valid request ID is provided.

If the request ID and the requester ID (the requester is that partner site requesting a key) match against stored values, the provisioning service datacenter 104 synchronizes the request to send the request to the web service datacenter 106. If the synchronize request function is disabled, no key is downloaded.

In response to the key request, certain embodiments of the web service datacenters transfer a stored key to a particular partner site 102. Other embodiments of web service datacenters transfer stored keys through the provisioning service datacenter 104 that are shared among one or a plurality of partner sites 102. In addition, the key transferred from any web service datacenters 106 to a particular partner site 102 is going to be identifiable to and associated with only that partner site.

The provisioning service datacenter 104 acts to manage the key distribution from one of a plurality of web service datacenters 106 to one of a plurality of partner sites 102. The provisioning service datacenter 104 includes a key transfer mechanism 110 and an automated control mechanism 112. The key transfer mechanism 110 provides for the physical transfer of the key from the web service datacenter 106 to the partner site 102 in response to a request from the partner site for the key 102. The automated control mechanism makes this key transfer more automatic by reducing the amount of human involvement associated with the key transfer and reducing the non-electronic transfer (e.g., using courier services and/or other mail services) of the key during key transfer.

This disclosure provides a device that enables operation of the Application Programming Interfaces (APIs) associated with the partner sites 102, the provisioning service datacenter 104, and the web service datacenter 106. Certain embodiments of the automated secure key distribution system 100 as described in the present disclosure allow for the use of symmetric encryption while other embodiments allow for asymmetric encryption.

In one aspect, keys are retrieved from the web service database 218 as shown in FIG. 2 in the web service datacenters 106. The keys for the partner site 102 can be transferred through the provisioning service datacenter 104 via the handler 216 to the connector 212 forming a connection 118 following a submitted request by an authenticated and authorized partner operator for a key from the partner portal 208. In one aspect, the handler 216 on the web service datacenter 106 performs additional encryption on the keys received from the web service database 218.

In one aspect, the partner operator is authenticated in the partner portal 208 using the web service datacenters 106 that are configured with key distribution to allow partner site operators to use web services. Once a partner site operator has been authenticated as a particular partner site 102, the partner site operator is given access via the provisioning service datacenter 104 to any set of partner site 102 attributes and/or keys contained in a web service datacenter 106 that they "own." In one embodiment, ownership of such attributes/keys is given to any partner site operator that has created that set of attribute/keys through the portal previously, or is granted access to them by another owner.

In certain embodiments, an owner or an authorized partner site operator of a particular partner site 102 may modify information stored in the provisioning database 214 and/or the web service database 218 that pertains to the partner site 102. The owner or partner site operator of the partner site 102 provides a security-based account.

In one embodiment, data generated, stored, and/or used within the automated secure key distribution system 100 by the provisioning service datacenter 104 can be transferred to the web service datacenter 106 through a secured (e.g., Simple Object Access Protocol [SOAP]) protocol over a standardized connection 118. SOAP is a lightweight protocol that is designed for data exchange in a decentralized, distributed environment. SOAP is based on the eXtensible Markup Language (XML) protocol and includes three parts: an envelope that defines a framework for describing what is in a message and how to process it, a set of encoding rules for expressing instances of application-defined data types, and a convention for representing remote procedure calls and responses. Data transferred from the partner site 102 to the provisioning service datacenter 104 can use the same protocol—Soap over HTTPS. The partner portal 208 is configured to allow the partner site 102 to receive their key.

In this disclosure, the "connector" 212 (included in the provisioning service datacenter 104 described relative to FIG. 2) and "handler" 216 (included in the web service datacenter 106 described relative to FIG. 2) respectively refers to the components and/or code that sends (connector) and receives (handler 216) messages (for example XML messages) between the provisioning service datacenter 104 and the web service datacenters 106.

Using known encryption techniques, the owner of a key maintains the private key secret in private, and the public key is provided to any third party for the purposes of authentication and establishing communications with that third party.

In one embodiment, the key downloaded through the provisioning service datacenter 104 from the web service datacenters 106 depends upon the email hash-link generated from the system. Once a partner site receives the email hash-link, it lands at a prescribed landing page. The prescribed landing page then goes through a vigorous security/requirement check on the email hash-link and is transmitted to the provisioning service datacenter.

Once the person who lands at the prescribed landing page passes validation, the provisioning service datacenter 104 performs synchronous download from the web service datacenter 106 in certain embodiments. The communication between the provisioning service datacenter 104 and the web service datacenters 106 is can be encrypted using a variety of methods including, but not limited to: SSL, IPSec, certificates, and/or keys which the provisioning service datacenter 104 has with the web service datacenter 106. A key queue is contained in the provisioning database 214. The presence of a request in the key queue can be monitored in certain versions. A key download process which occurs when a partner site operator receives the email link.

In one version, data from the partner site 102 can initially be stored within the provisioning database 214 (in the provisioning service datacenter 104), and the stored data can then be accessed and then forwarded to the web service database 218 (in the web service datacenter 106). The data forwarded from the partner site 102 can include such fields as the Root Universal Resource Locator (URL), cobranding URLs, text, and web service datacenters 106—specific flags in certain embodiments.

An owner of a partner site may modify the technical contact and the remainder of the partner site information (including partner data destined for the web service datacenter 106) in certain embodiments. In one version, an owner of a partner site may also grant the same access to other authenticated partner site operators.

A more detailed version of certain components of certain versions of the provisioning service datacenter 104 of the automated secure key distribution system 100 described relative to FIG. 3. One embodiment of provisioning service datacenter 104 contains a number of tiers or portions including an interface portion 301, a middle tier and connector portion 302, and a data storage portion 303.

The interface portion 301 includes the partner portal 208, a service handler 320, and the operation portal 210. The interface portion 301 is also referred to as a "front end" because it is in direct communication with a number of other computer portions. One embodiment of the partner portal 208 provides an interface with the partner site 102. The service handler includes code that can interface with a service connector. The operation portal 210 provides for interface with the business operations 306.

The version of the partner portal 208 shown in FIG. 3 includes a key download portion 350 and a manage applications portion 352. In one version, the code for the front end or interface portion 301 consists of Active Server Pages.NET (ASP.NET, which are produced and made available from Microsoft) pages with code-behind files and assembly dynamically-linked libraries (DLLs).

One embodiment of the key download portion 350 manages the download of the key from the web service datacenter 106 to the partner sites 102 based on the request from the partner site. The manage applications portion 352 manages the applications within the provisioning service datacenter 104, in order to communicate the applications to the web service datacenter 106. In addition to the key download portion 350 and the manage applications portion 352, the partner portal 208 can include a variety of software portions including, but not limited to, a compliance capacity planner portion, a partner site operator information/planner portion, a user information portion, a capacity planning portion, and a company information portion.

The embodiment of middle tier and connector portion 302 shown in FIG. 3 includes a middle tier portion 324, a provision portion 330, an asynchronous queue 332, the connector 212, and the store 334. In addition to a front end through the user interface, the provisioning service datacenter also accepts SOAP messages in its handler on HTTPS transport as an interface which is largely automated. In one version, the SOAP messages may be used for a service to query access control information about a particular partner. In other versions, this usage may be expanded.

The middle tier portion 324 provides middle level service for the partner portal 208, the service handle 320, and the operation portal 210 in the version shown in FIG. 3. The middle tier portion 324 is in communication with the provision portion 330 in such a manner that information received from the partner sites 102, the service connector 304, and the business operations 306, (as well as from the web service datacenter 106) that is to be stored into the data storage portion 303 enters the provision portion 330. In one version, the store portion 334 controls the storing of information for the data obtained from the provision portion into the data storage portion 303.

In one embodiment, the data storage portion 303 includes one or more configuration databases 336, a read database 338, and a write database 340. The data storage portion 303 may also be referred to as a "back end". The data storage portion 303 includes the provisioning database 214 as shown in the embodiment of automated secure key distribution system 100 shown in FIG. 1. The databases 336, 338, and 340 can each be structured as a Structured Query Language (SQL) server or another type of database that can store data (possibly following known data storage techniques). In one embodiment, the configuration databases contains information describing the configurations of the partner site 102 and the web service datacenter 106 to provide for, among other things, key transfer from the web service datacenter 106 and the partner site 102.

In one version, the read database 338 contains information such as key request information that is read only from another location such as the web service datacenter 106. The write database 340 contains a duplicate set of information that is contained in the read database 338, but that can be written into (includes a read/write medium). In one embodiment, the SQL Servers store user information, keyed off of the user ID, including their associations with the partner site's data. Access to the SQL servers from the front end or gateway is provided through the store 334. The store 334 is set up to use authentication and access to specific tables is specified at its setup program.

In one version, key requests from the partner site 102 to the web service datacenter 106 are sent directly through the asynchronous queue 332. The asynchronous queue 332 is a queue associated with the databases forming the data storage portion 303 that stores requests to send to service. In one version, the business operations portion of the provisioning service datacenter 104 still can update data through managed applications. One version of the asynchronous queue is a service running as a low-privileged domain account.

One version of the connector 212 includes a non-scriptable COM object called either by the asynchronous queue 332 or the middle tier 302 when a call to web service datacenter is requested. In one version, the COM object does validation of calls to itself using the read database 338 as a reference.

Certain versions of the automated secure key distribution system 100 provide for a web service datacenter 106 user requirement. For a key download task, the partner site operator can use a secure pin. The sign-in user interface window can be relatively short in length in certain embodiments since a considerable amount of information can be provided by the data of the hashed email. The partner site operator is email validated for a particular web service provided by the web service datacenter. An email validated web service indicates the web service has sent an email to the partner site 102 and partner site responded or clicked on the link through their inbox. Key download requests and assignments are stored in the store 334.

One embodiment of the provisioning service datacenter can store encrypted raw data associated with the request in the form of a request ID in the operational request queue. The operational request queue is a queue that allows the operational portal 210 (shown in FIG. 2) to perform approval on requests such as key request. The key output can be encrypted during transmission, and decrypted upon reception. The key version field can be provided so business operations (of the provisioning service datacenter 104) can view the key version field value later.

In one embodiment, the key transformation process can include one or more random number generators, and can rely on techniques to randomize a raw key. In one version of the provisioning service datacenter 104, a function of a randomly generated raw key is returned from the handler 216. For another version, another function of a randomly generated raw key is placed into key template. For another version, another function of a randomly generated raw key is returned as a flat file.

In one version of the automated secure key distribution system 100, the key transformation (e.g., a randomized raw key) is handled based upon the passed in platform parameter or operating system type. In addition, the provisioning service datacenter's 104 site manager can also perform a provisioning service datacenter site encryption process. Many versions of the provisioning service datacenter encryption process include Base64 encoding. When the connector 212 as described relative to FIG. 2 receives the return value from the handler 216 and the provisioning service datacenter site manager, the download key function performs an provisioning service datacenter site decryption process to get the key transformation (using e.g., the randomized raw key).

There are a variety of the provisioning service datacenter site manager and download key values that include the randomized raw key and its derivatives. In one version of the automated secure key distribution system 100, for example, a key queue is modified since the transfer of the keys will become automated, and will not require manual processes. Only in rare circumstances (e.g., in an emergency back out plan) is it necessary to provide manual key transfer mechanisms. Under those rare circumstances a separate mechanism may be provided to upload the XML, and key data to the web service datacenter manually.

Partner Site Roles

There are a variety of roles for operators at the partner site 102 in certain embodiments of the automated secure key distribution system 100. These roles are illustrative and may include, but are not limited to a security administrator and/or security delegate role, an application administrator role, and a key user role. It is emphasized that a slightly modified version of the automated secure key distribution system 100 may include slightly modified roles or roles having different names. In a large automated secure key distribution system 100, there may be many (tens or even hundreds) of roles. As such, the following description of the roles is illustrative in nature and not limiting in scope. Each role can be provided different rights relative to the automated secure key distribution system. A partner site representative at a partner site is provided different responsibilities within the automated secure key distribution system 100 based on their role(s) or lack thereof. A single partner site operator at the partner site 102 may simultaneously perform none, one, or more of these roles. The roles of individual entities may be embodied in software.

A security administrator and/or security delegate role in the partner site has permission to request a key, access and update privilege to the key request management page, and the ability to download a key. Within one embodiment of the automated secure key distribution system 100, only a single partner site representative (role) is held responsible for the security a management of keys that are downloaded to that partner site.

In one embodiment, the a security administrator and/or security delegate role has primary responsibility for management of encryption keys requested and downloaded. The partner site operator is assigned the security administrator role (or security administrator delegate, having essentially the same permissions, but cannot delegate his or her permissions to another operator). The security administrator and/or security delegate role may optionally be contractually prohibited from relinquishing the security administrator and/or security delegate role. A partner site operator assigned to the security administrator and/or security delegate role may also be an application administrator role.

In one version, the application administrator role in the partner site can create and modify applications. Application administrators have the ability to view application details, but are unable to download a key. In certain versions, a partner site operator assigned to the application administrator role may also hold the security administrator and/or security delegate role.

The key user role at the partner site is similar to the owner role within the partner portal (they are both "owners" of partner sites 102 with a special ability to request the existing key or download a new, versioned key). Furthermore, in one version, one partner site operator has this role at any instant of time for an application/partner site. The reason why it is preferred to maintain one key user role is that the fewer people know a secret afforded by the key, the better. The key user role at the partner site may have a security-based application program secure PIN credential. In certain embodiments, the key user role can download a key.

There has to be a mechanism for adding a partner site operator to the key user role. The security administrator and/or security delegate role has update privilege to the key request management details page. Any partner site operator assigned to any other role may be assigned to the security administrator and/or security delegate role.

Key Transfer Process

Figure 4:
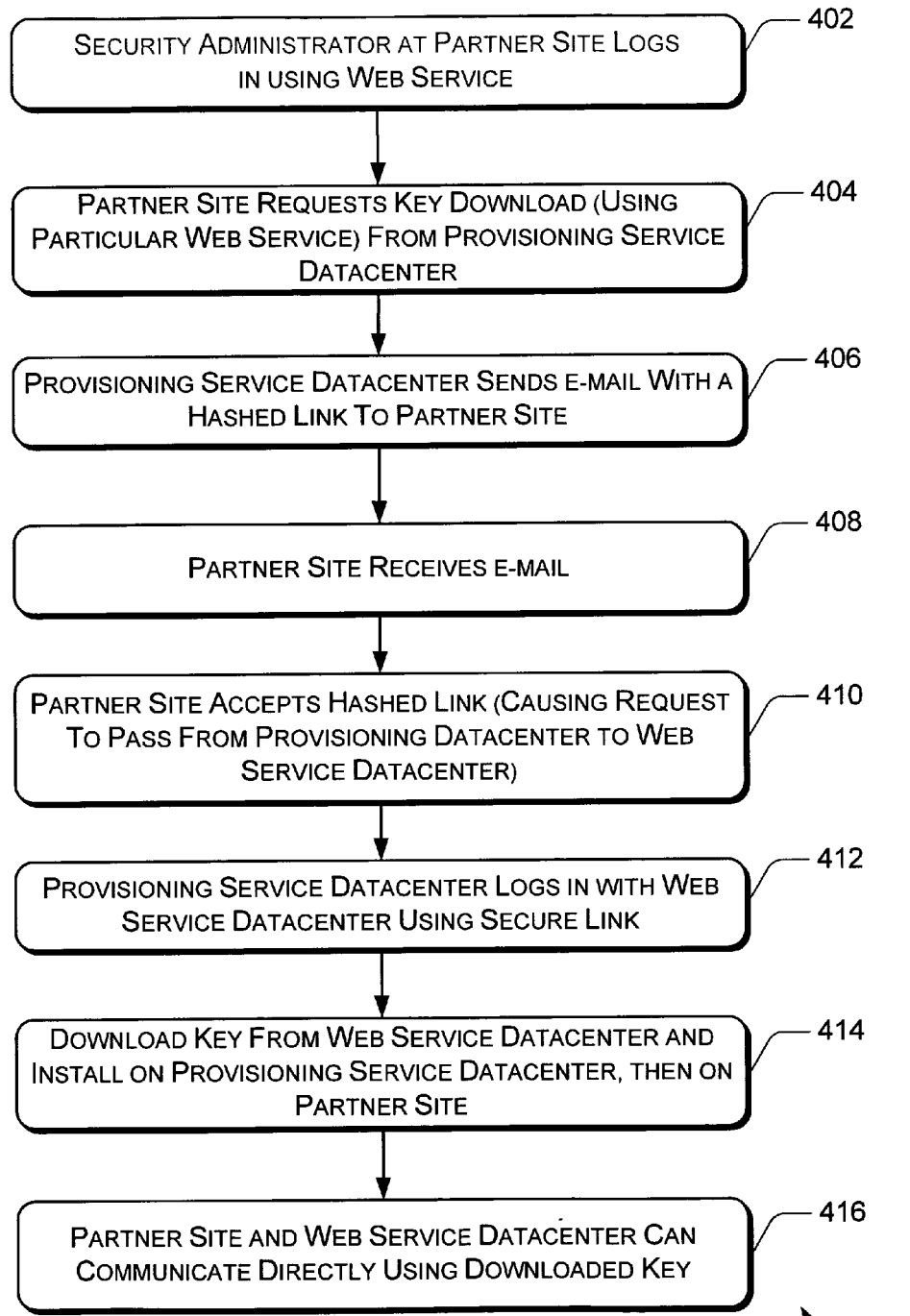
FIG. 4 is an exemplary key transfer process.

FIG. 4 shows one embodiment of a key transfer process 400 by which a key is automatically transferred from the web service datacenter 106 to the partner site 102 via the provisioning service datacenter 104 as shown in FIGS. 1, 2, and 3. As such, when considering the key transfer process 400 of FIG. 4, the reader should consider the reference characters described relative to certain ones of FIGS. 1, 2, and 3 as described herein.

In one embodiment, the key transfer process 400 includes 402 in which the partner site 102 logs in at the provisioning service datacenter 104 for a specific web service provided by a particular web service datacenter 106. In 404, the partner site 102 transmits a request for a key download to the provisioning service datacenter 104. In one version, the request is associated with a particular web service (e.g., a particular partner site is requesting a "Passport" web service key). In one version, successful key download involves interaction from one requesting partner site 102, the provisioning service datacenter 104, and the web service datacenter 106 that is associated with the requesting partner site. The key download request can be submitted from the partner site to the provisioning service datacenter in a variety of configurations including a queue. The operators of the provisioning service datacenter can contact the partner site 102 to verify the download request.

In 406, the provisioning service datacenter 104 transmits an e-mail to the partner site 102 including the hashed link to that partner site that requested the key. In one embodiment, the email is transmitted in response to the request sent from the partner site.

Figure 6:
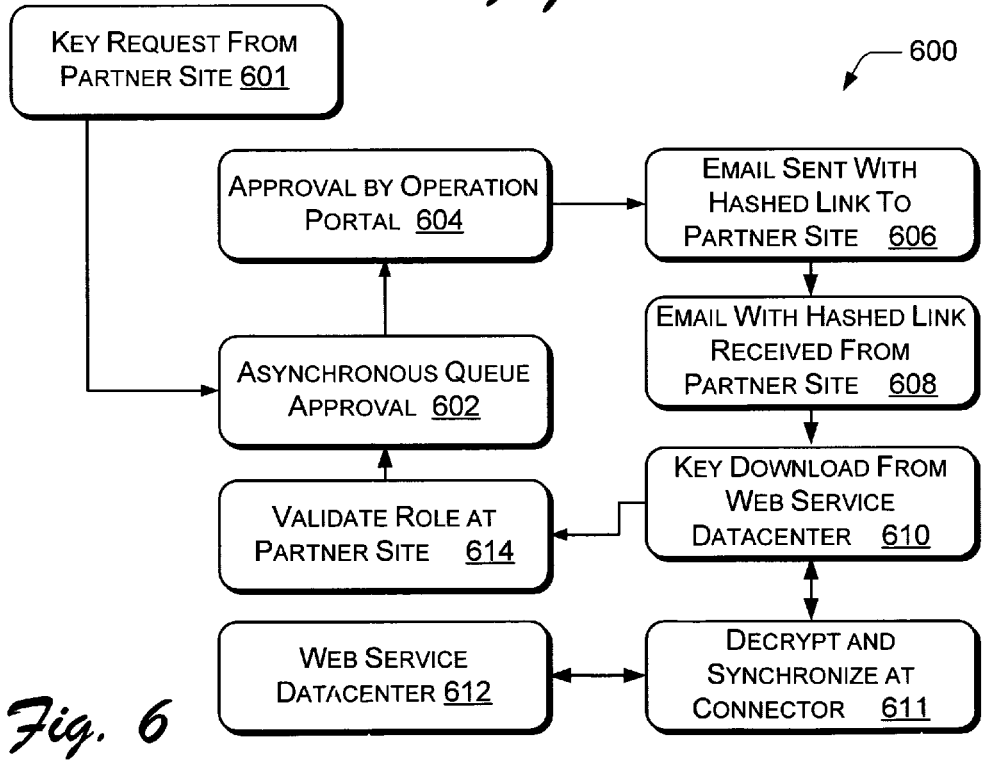
FIG. 6 is a flowchart illustrating an exemplary key download mechanism.

FIG. 6 shows one embodiment of a key download mechanism 600 as relating to the provisioning service datacenter 104. The key download mechanism 600 includes 601 in which a key request is received from the partner site 102 as shown in FIGS. 1 and 2. In 602, the key request starts asynchronous queue 332 (as shown in FIG. 3) approval. In 604, the key request is approved by the operation portal 210 as shown in FIG. 3. In 606, an email is sent including a hashed link to the partner site 102 as shown in FIGS. 1, 2, and 3.

In the embodiment of key download mechanism 600 shown in FIG. 6, in 608 the email having the hashed link is received from the partner site 608. The hashed link was selected (clicked on) by one of the suitable roles at the partner sites as described in this disclosure in one embodiment. The provisioning service datacenter 104 requires a role within the operations portal and/or security administrator role in partner portal to approve the request. Once the request is approved, the email hash link is sent out to the requestor at the partner site 102.

In 610, partially in response to 611 and 612 as described herein, the key is downloaded from the web service datacenter 106 as shown in FIGS. 1, 2, and 3. 611 involves decrypting and synchronizing information based on the key request from the connector 212 of the provisioning service datacenter 104 with the web service datacenter 106 as shown in FIG. 2 in 611 and 612. As a result of the decryption and synchronization as provided in 611 and 612, the key download is permitted from the web service datacenter 106 to the provisioning service datacenter 104. The key that is received from the web service datacenter 106 into the provisioning service datacenter 104 enters the asynchronous queue 332 as shown in FIG. 2. In 614, the role is validated at the partner site 102 as shown in FIGS. 1, 2, and 3.

In one embodiment, the email with a hash that is sent to the partner site contains a transaction identifier and other certifiable information. The transaction identifier is intended to match the information stored in the provisioning database 214 for this particular request. In one embodiment, the transaction identifier can only successfully execute once after which its status is updated. This limits recurring download results based upon the email hash, and ensures that only the person who is supposed to be downloading the key (a security administrator role, a security delegate role, or a key user role) is able to download the key. In 408, the partner site 102 receives the e-mail containing the hashed link from the provisioning service datacenter 104.

In 410 of the key transfer process 400, one of the roles at the partner site 102 first accesses the web site to "request" the key. In certain embodiments, as illustrated in FIG. 4, the operator role "approves" the key request. Following this approval, that role at the partner site 102 is sent an email where there is a link included that selects the hashed link by, for example, clicking on the hashed link. It is the combination of some action by the correct entity (i.e., role) at the partner site which, when received by the provisioning service datacenter 104, causes the provisioning service datacenter to forward/download the key request that is being maintained at the provisioning service datacenter to the web service datacenter.

The action at the partner site of selecting the hashed link acts to transfer the request already transferred from the partner site 102 to the provisioning service datacenter 104 to the web service datacenter 106. The requesting partner site selects in certain versions (e.g., by clicking the mouse) the link, logs in to provisioning service datacenter 104 through the web service datacenter 106, with web service datacenter 106 PIN verified, with a role such as the a security administrator and/or security delegate role that permits the individual in the role to download keys checked, with hash checked. The downloaded code, which may either be in a flat format (such as a binary file) or an executable format in certain embodiments from the web service datacenter 106 is run by the partner site operator in the partner site 102. In different versions, the flat file is simply the key within itself, or alternatively the executable takes the key it stores and places the key into the computer's registry.

In 412, the provisioning service datacenter 104 logs in with the web service datacenter 106 in response to the key request to establish a secure link using, e.g., appropriate connection 118 and connection 119, SSL, and the shared secret. In one embodiment, the secure connection 118 and connection 119 are configured to be sufficient to transfer the key from the web service datacenter 106 through the provisioning service datacenter 104 to the partner site 102.

In 414, the key transfer process 400 downloads the key from the web service datacenter 106 (on the web service database 218) down to the provisioning service datacenter 104, and then subsequently to the partner site 102. The downloaded/transferred key at the partner site can then be used to establish a secure communication with the consumer 103 as shown in FIG. 1.

In one version, the encryption key coming from the web service datacenter 106 is downloaded through a secure key download process (e.g., using the standardized Secure Sockets Layer (SSL), in conjunction with the shared secret) in 414 through the provisioning service datacenter to the partner site. In 416, the partner site is able to communicate via interface connection 120 directly to the web service datacenter 106 as shown in FIGS. 1 and 2 (and not through the provisioning service datacenter).

When an authorized partner site requests the site's key from the partner portal's 208 key download page. Once requested, to provide the key download landing page using the email hashed link, the following steps occur:

a) a suitable person (i.e., role) at the partner site 102 selects the hashed email link sent earlier using, in one version, SMTP communications, but in different embodiments can be through an alert or a programmatic process.

b) the provisioning service datacenter 104 then compares the hashed information that it received to verify its validity;

c) the provisioning service datacenter creates an audit record of the key-download request within the database of the provisioning service datacenter 104 (which contains for example the partner site user's ID, the application ID, and timestamp that the key was requested); and d) the provisioning service datacenter then creates the connection 118 between the connector object 212 and the handler 216 for the partner site 102 to download the key.

The connector 212 object's methods also require a partner site operator's identifier that is compared with the database of the provisioning service datacenter 104 for authorization prior to connecting to the handler 216 of the web service datacenter 106. In one version, if the partner site operator's identifier is either not in the database of the provisioning service datacenter 104 or is not associated with the partner site requested, the call fails and an event is triggered in certain embodiments that indicates possible intrusion. This triggering can occur on certain versions since the user interface (UI) should limit the partner site user being navigated to the pages without the email sent to them.

In certain embodiments, the connector 212 makes a request to the web service datacenter 106. In one aspect, the "web service datacenter 106" is determined by a Universal Resource Locator (URL) within the database of the provisioning service datacenter 104 that points to the handler 216, which is an object or program that exposes a SOAP server with a proprietary protocol. The URL is specific to certain web service datacenter's 106 servers.

The web service datacenter 106 trusts the provisioning service datacenter 104 to authorize the partner site operator for the key download in certain embodiments. In one aspect, the request can be provided over a Secure Sockets Layer (SSL), with the SOAP payload in the HTTPS request and the response coming in the HTTPS response. In one aspect, there is no "callback" to the provisioning service datacenter 104 from the web service datacenter 106 since the provisioning service datacenter 104 initiates calls.

In one aspect, the HTTPS request also sends a client certificate to the handler 216. The settings for the handler 216 on the provisioning server should be configured such that client certificates are required, and that the client certificate be mapped to a domain account that only has permissions to handle the interface being set up. Requests to the handler 216 can be IP filtered to the accepted list given to the web service datacenter 106 through the operations portal 210 by the provisioning service datacenter 104.

In certain embodiments, the handler 216 located in the web service datacenter 106 reads the request, fetches the key from within the web service database 218, and returns the request to the connector in the HTTPS response (that is SOAP-encoded). The connector object 212 within the provisioning service datacenter receives the response, inserts it into an executable and/or binary file, and returns the executable and/or binary file to the partner site 102 via the HTTPS response.

Provisioning service code could be integrated in one version of the web service datacenter 106, allowing applications to be inserted/updated from the provisioning service datacenter 104, and to allow the provisioning service datacenter 104 to request a key on behalf of an authenticated, authorized partner site 102 in certain embodiments. The database cache can then be securely refreshed.

The transaction for the partner operator is stored in an operation request table (e.g., within a queue) in the provisioning service datacenter in certain embodiments. This is done during key download request. To calculate the expiration date for a request, a configuration value (e.g., Expiration Duration) is added. A retry count operation is added to operational request table to keep track of how many times the request has been attempted to be downloaded in certain embodiments. The configuration file (such as stored in the configuration database(s) 336) reduces replay exposure for the key.

Once a request succeeds by downloading a key, the request is completed (request status) in certain embodiments. The same request cannot be downloaded through the email link again to obtain another key. However, the partner site operator is able to request the same key again through key request process gain. When the operation portal 210 approves the request, an email link is generated and sent out to the requester partner site 102. In one version, the email link appears in the form: https://netservicesmanager.com/wizard/applications/keyrequestland.aspx ?nps=XXX in certain embodiments.

The provisioning service datacenter 104 can include an encrypted request ID in the operational request operation in certain embodiments. Technically, the provisioning field is an encryption of request ID with the provisioning site ID. As such, the provisioning field does not have to be a hash in certain versions. A similar approach as the query parameter is used in web servers provided by the web service datacenters 106. Certain embodiments of the automated key transfer device 100 scale better than the prior-art key transfer devices, and provide for greater acceptance of security key systems.

In certain embodiments of the web service datacenters 106, the web service datacenter site manager handles a randomized raw key based upon a "passed-in" platform (or the type of the operating system) parameter. In other embodiments of the web service datacenters 106 do not require the passed in platform parameter; rather the provisioning service datacenter 104 grabs the raw key and determine whether the partner site 102 requires a .exe or flat file. In addition, the provisioning service datacenter site manager also performs a provisioning site encryption operation.

Therefore in certain embodiments, the provisioning service datacenter site manager returns such provisioning site encryption processes as a provisioning site encryption (e.g., randomized raw key) function or a provisioning site encryption (e.g., rawkey) function, which in many versions includes base64 encoding. When the connector 212 receives the return value from the handler 216 and the provisioning datacenter site manager, the download key function performs a provisioning service datacenter site decryption process to get the raw key transformation (e.g., the randomized raw key) that can be applied into the key template.

When an actual key download request lands, one embodiment of which is described in this disclosure relative to FIG. 6, the partner site operator meets web service datacenter 106 user requirements. In one version, the partner site operator is provided with either the key user role, the security administrator role and/or the security delegate role. The pages key download land and key request land then will first decrypt the provisioning service datacenter 104 and check whether a valid request ID is revealed. If so, it calls a program to check the email link to ensure the request ID has not been successfully downloaded and the request ID has not expired.

In addition, the requester ID will be checked in certain embodiments. If everything is acceptable as checked within the stored key request process, the process calls a synchronize request process that sends the key request if the automated process is enabled. If the automated process is disabled, no request process is followed and therefore no key is downloaded. If a request was granted before the automated process becomes disabled, a new message is used to ask the partner site operator to send a new request to business operations of the provisioning service datacenter 104 for manual download.

For certain embodiments of the web service datacenter 106 key requests), the requestor will be able to request the current version of a key, or a new version of the key.

In one version of the partner portal 208, only one role associated with each partner site 102 (i.e., either the key user, the security administrator, or the security delegate in certain embodiments) is able to make a key request. Certain embodiments of the provisioning service datacenter can also approve or deny a key request using their operational console. The security administrator and/or the security delegate role is able to approve or deny any key request for the applications he/she has responsibility.

In one version, a key request made by an application administrator role is processed (approved/denied) by the security administrator or security delegate roles. In another version, a key request made by an application administrator role is auto-approved, and the email hash is sent to the application administrator role that made the key request to effect the key download. In one version, a key request made by the security administrator or security delegate role is auto-approved, and the key download email hash is sent to the security administrator or the security delegate role that made the key request.

In one version, a key request within the operational console is auto-approved, and the key download email hash is sent to the partner site operator that made the key request. A mechanism is provided for the security administrator and/or security delegate role cancels an already approved key request. There may be a situation where a key request, once approved, cannot be downloaded by the application administrator role due to unforeseen circumstances such as their being away from the office. In one embodiment, the security administrator or security delegate roles can "short-circuit" the process to allow a new key request by another application administrator role, before a download timeout period expires. In other embodiments, the operator role is also able to short circuit the process prior to the download timeout period expiring.

Only the requester may download a key in certain embodiments. Once a key request is approved by the security administrator or security delegate, the application administrator role or security administrator and/or security delegate role that made the request can have a prescribed duration (e.g., 72 hours) to initiate key download. Any download attempts made before key request approval, or after the time window has passed, will not be allowed in certain embodiments.

If a key download is not successful after a prescribed number of attempts for any reason, a new key request process can be initiated in certain embodiments. A method for the partner site operator to confirm that a key download was successful in the new key request can be built into the user interface. In the event that the hash email fails to reach the requester, the security administrator or security delegate role resends the email. The provisioning service datacenter 104 should be able to resend the email from its operational console.

In one version, the secure key download process implemented in the web service datacenters 106 will be extended to cover key download requirements for services and key types.

The business operations of the provisioning service datacenter 104 role will be granted the same permissions for key management within the operational console as the security administrator or security delegate role has within the developer portal in certain embodiments. The operational console will maintain the web service datacenters 106 key queue page used in the web service datacenters 106 to determine if a key should be shared and to assign the correct ID field.

Workflow States

Figure 5:
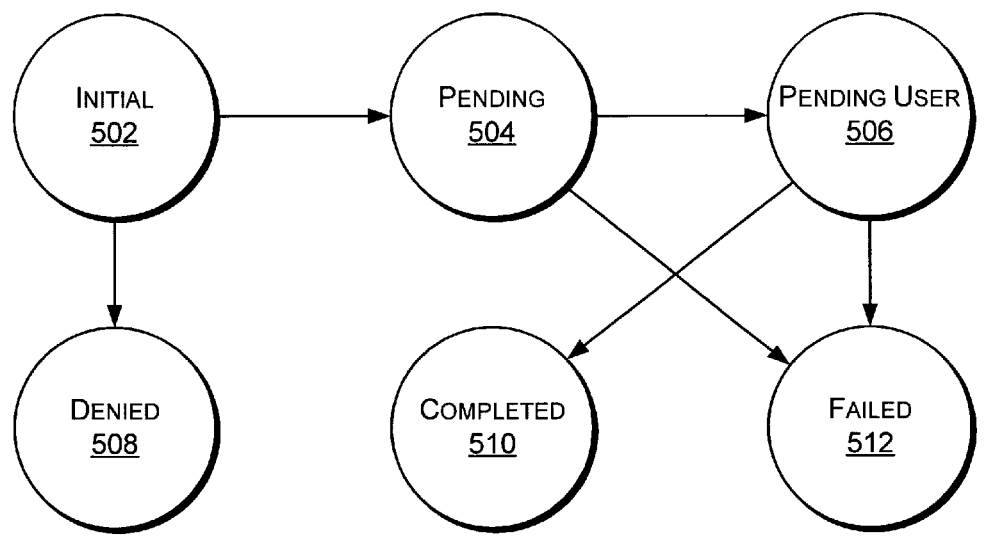
FIG. 5 is an exemplary key request state diagram.

There are multiple workflow states as shown in a key request state diagram 500 FIG. 5 that include an initial state 502, a pending state 504, a pending user state 506, a denied state 508, a completed state 510, and a failed state 512. To properly handle a key request through its lifetime from request to download, a state attribute is assigned to the key request record in certain embodiments. The initial state 502 signifies a new key request that has been made, but has not yet had shared key determination performed. The pending state 504 signifies a key request that has had shared key determination performed but has not been approved. The pending user state 506 signifies a key request that has been approved or auto-approved, and has not yet failed or completed.

The completed state 510 signifies a key request that has been successfully downloaded by the requester. The failed state 512 signifies a key request that in certain embodiments was not downloaded successfully by the requestor due to missing some prescribed time period time window (e.g., 72 hours), not succeeding in download after 3 attempts, or was not attempted to be downloaded by the security administrator and/or security delegate role after canceling an approved key request in certain embodiments. The denied state 508 signifies a key request that was denied by the security administrator and/or security delegate role or the operator.

Considering the key request, the messenger will have a key request page and workflow that will give a partner site operator the ability to request a key for either the Passport or Alerts web service datacenter 106 service. In certain versions, only an application administrator role or security administrator and/or security delegate role can request a key. Once a key request has been made, no other key request can be made for that application, web service, and/or environment combination until the existing key request moves to the completed state 510, the failed state 512, or the denied state 508.

One version of web service datacenter 106 allows a maximum number (e.g., 2, 35, etc.) of versions of a key. If a partner site operator requests and downloads a new key for one version of a web service datacenter 106 that already has multiple valid keys, the oldest key will be expired.

Modified Key Download Process

Figure 7A:
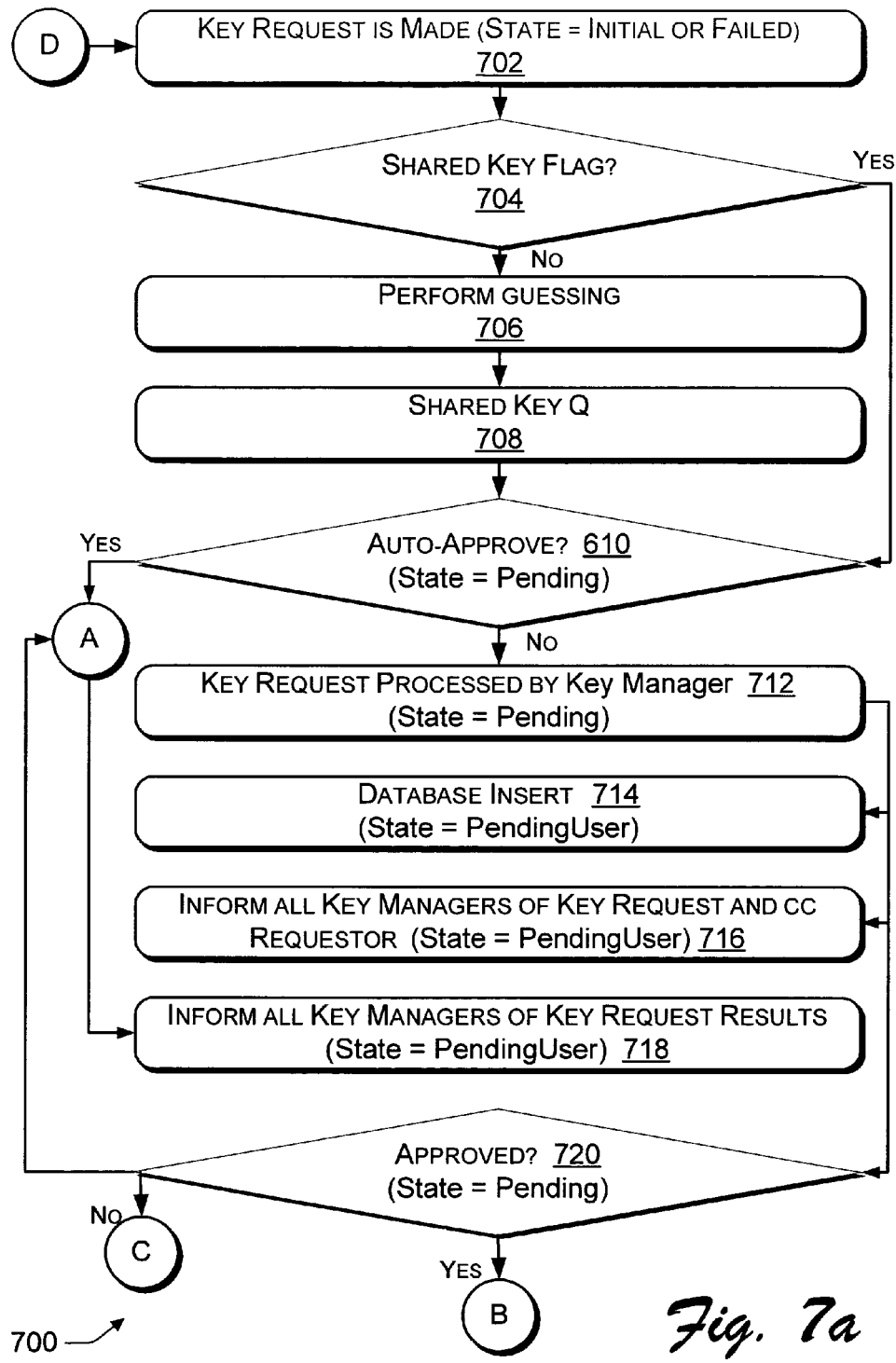
FIGS. 7a, 7b, and 7c illustrated an exemplary key download process.
Figure 7B:
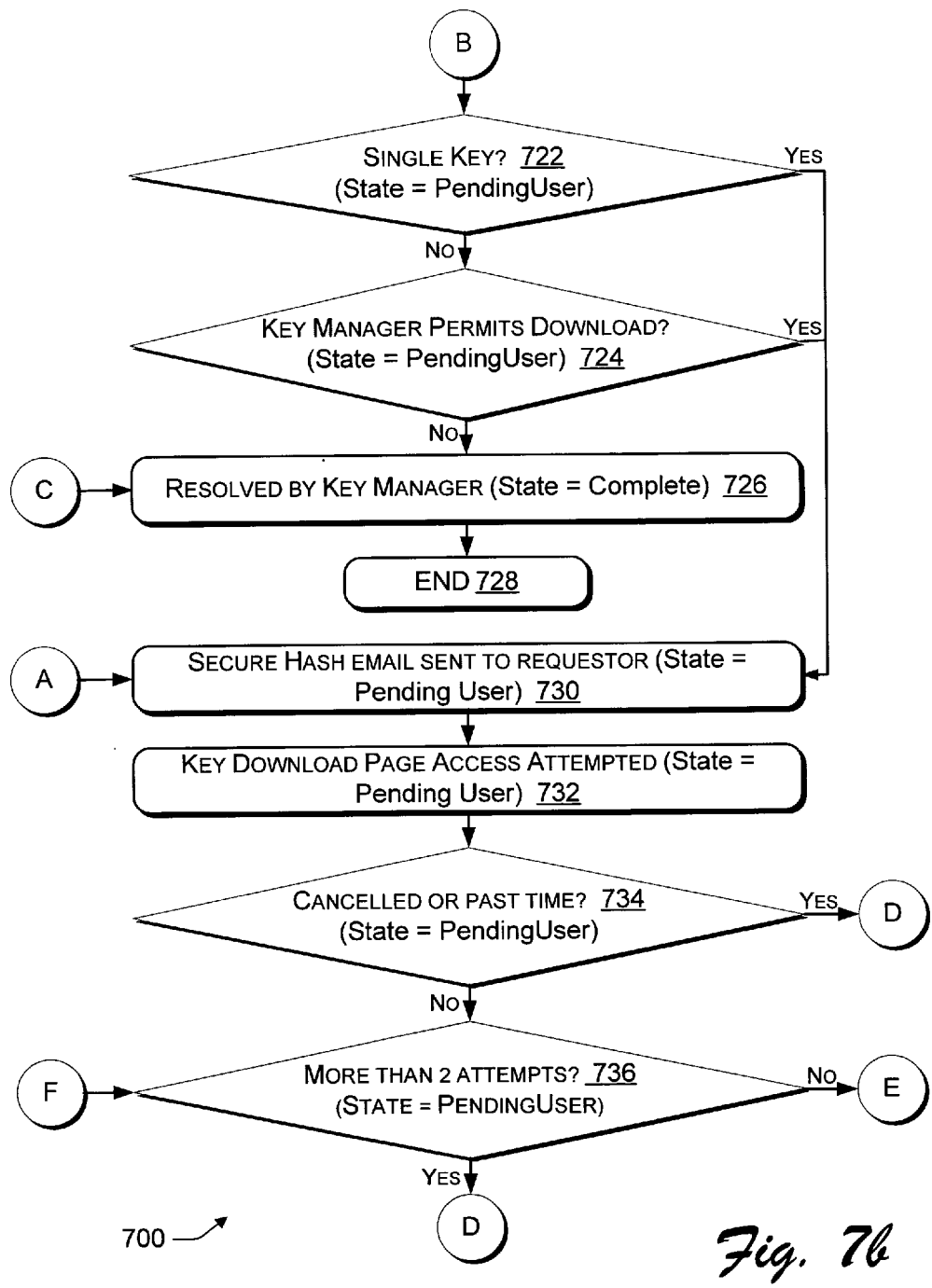
Figure 7C:
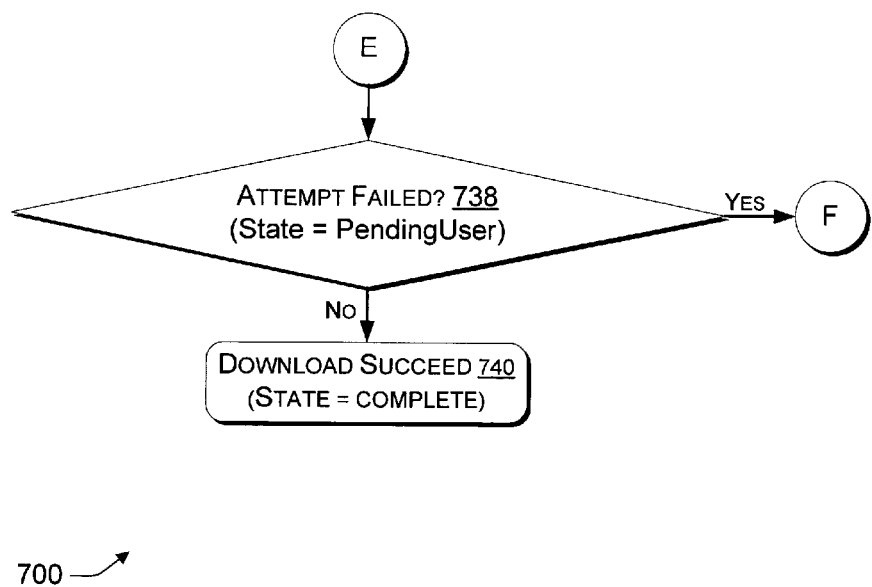

FIGS. 7a, 7b, and 7c show another embodiment of a key download process 700 as viewed primarily within the provisioning service datacenter 104. The key download process 700 includes making a key request 702. When the key request 702 is initially made, the key download process 700 is in its initial state.

The key download process continues to decision 704 in which it is determined whether the key is shared as indicated by the shared key flag, as described in this disclosure. If the answer to decision 704 is yes then the key download process 700 continues to decision 710 in which it is determined whether the key download process is auto-approved in certain embodiments. When in decision 710, the state of the provisioning service datacenter 104 is pending.

If the answer to decision 704 is no, indicating the flag is not shared, then the key download process 700 continues to 706. Within 706, the provisioning service datacenter 104 performs guessing. The key download process 700 then continues to 708 in which the provisioning service datacenter 104 shares the key queue. The key download process 700 continues to decision 710 in which it is determined whether the key download process is auto-approved. When in decision 710, the state of the provisioning service datacenter 104 is pending.

If decision 710 results in a yes answer, then the key download process continues to 718 in which the security administrators and/or security delegates are informed of the key request results (that the key download process is auto-approved) in certain embodiments. If the answer to decision 710 is no (indicating that the key download process 700 is not auto-approved), then the key download process 700 continues to 712 in which the key request is approved by the security administrator and/or security delegate. When the key download process 700 is within 712, the state is pending.

Following 712, the key download process continues to 714, 716, and decision 720 (possibly simultaneously). In 714, the key download process inserts data in the appropriate database(s) in certain embodiments. When in 714, the key download process is in the pending user state. In 716, security administrators and/or security delegates are informed of the results of the key request, and the requestor also communicates with.

In decision 720, it is determined whether the key download process 700 is approved. If the answer to decision 720 is yes, then the key download process 700 continues to decision 722 in certain embodiments. If the answer to decision 720 is no, then the key download process 700 continues to 726 in which the key download process is resolved by the security administrator and/or the security delegate. When in state 726, the state is complete, and the key download process ends at 728.

In decision 722, it is determined whether there is a single key. When in 722, the state is pending user. It the answer to decision is no, then the key download process 700 continues to 724 in certain embodiments. If the answer to decision 722 is yes, then the key download process continues to 720 in certain embodiments. Within decision 724, it is determined whether the security administrator and/or the security delegate permit a download. In decision 724, the provisioning service datacenter 104 is in the pending user state. If the answer to decision 724 is yes, then the key download process 700 continues to 730 in certain embodiments. If the answer to decision 724 is no, then the key download process continues to 726. When in state 726, the state is complete, and the key download process ends at 728 in certain embodiments.

When in 730, the secure hash email is sent to the requestor. When in 730, the state is pending user. Following 730, the key download process 700 continues to 732 in which the key download page access is attempted. When the 732, the provisioning service datacenter 104 is in its pending user state. The key download process 700 then continues to decision 734 in which it is determined whether the key download process 700 is cancelled or past time. If the answer to decision 734 is yes, then the process returns to 702 in which a new key request can be made (and the provisioning service datacenter 104 is in its failed state). Following 702, the key download process is re-attempted for any subsequent or re-attempted key downloads.

If the answer to decision 734 is yes, then the key download process 700 continues to decision 736 in which it is determined whether there are more than two attempts. If the answer to decision 736 is yes, then the key download process continues to 702 in which a new key request can be made (and the provisioning service datacenter 104 is in its failed state). Following 702, the key download process is re-attempted for any subsequent or re-attempted key downloads.

If the answer to decision 736 is yes, then the key download process 700 continues to decision 738 in which it is determines whether the attempt has failed. If the answer to 738 is yes, then the key download process continues to decision 736 as described above. When in 738, the state of the provisioning service datacenter 104 is pending user. If the answer to decision 738 is no, then the download succeeds in 740, and the state of the provisioning service datacenter 104 is complete.

Key Request Emails

To obtain the correct key in certain embodiments of the automated secure key distribution system, the partner site 102 that made the key request understands its operating environment. The appropriate environment can be selected on the key request page. Once these selections are made, the requestor clicks the "key request" button to submit the request.

The key status text will indicate if there is an existing key request, along with the date/time the request was made in certain embodiments. In certain embodiments, if the application administrator rolem the security administrator role and/or security delegate role did not make the existing request, the pages functionality (operating environment selection, version requirement, and the "key request" button) will be disabled. Alternatively if the application administrator role, the security administrator role, and/or security delegate role made the existing request, the pages functionality will include a facility to cancel the request. Other functionality (operating environment selection, version requirement, and "key request" button) will be disabled in certain embodiments. Once the key request operation has been clicked on the key request page, the appropriate email is auto-generated and sent, and the database is updated.

There are a variety of versions of e-mails that can be used for key request notification. A key request email is automatically sent under certain conditions for key request notification, as follows. When a key request is submitted an email is automatically created and sent to the security administrator and/or security delegate roles and also to the application administrator role that made the key request.

Certain embodiments of the email for a key request will contain text similar to: A request for a <new/current version> <environment> <service> <windows/non-windows> key has been made by <requestor name> for Application <application name> within site <site ID> on <request date/time>. This request is reviewed and approved before the key is downloaded. To review and process this request please visit the service manager key request management page at <URL for the key request management page>. Note that this email follows HTML conventions since it is programmed using SOAP.

When the security administrator and/or security delegate role requests any key or the application administrator role requests the key, an email is automatically created and sent to the security administrator role and/or the security delegate role. This email will contain text similar to the following: a) a request for a <new/current version> <environment> <service> <windows/non-windows> key has been made by <requestor name> for application <application name> within site <site ID> on <request date/time>. b) This request has been auto-approved and <requestor name> has been sent a secure key download email to facilitate the download process; or to review this request please visit the web service manager key request management page at <URL for key request management page>.

A key download hash email that is consistent with the provisioning service datacenters 104 specification is sent to the role that made the key request. When a key request is submitted, the database can be updated with the request information including, for example, site ID, application name, web service, key type, requestor name, requestor email address, date/time of request, and initial state.

In one variety of shared-key determinations, the provisioning service datacenter's 104 system would "guess" if the requested key may be a shared key by comparing the application domain name to a static list of domain names designated as shared key domains in certain embodiments. An operations portion at the provisioning service datacenter 104 makes the final determination and associates the key request with the appropriate root site ID field if a shared key should be used. Key management removes as much mandatory operational involvement in key provisioning as possible, thereby largely automating the key management. Shared key determination, as detailed in this disclosure, is implemented to meet this in certain embodiments.

In one aspect, when a web service datacenter 106 key request is initiated, the value of the application ID field will be used to lookup the value of shared key flag in the application service table. The shared key flag can be set to indicate whether the key may be shared (as determined by domain name "guess"). One value of the shared key flag indicates the key may be shared while another indicates that the shared key flag will not be shared. Keys placed in this queue will have their state changed to pending. Each record can be reviewed to determine if the key should be single or shared in certain embodiments.

A key request providing approval, denial, or cancel functionality is used to review and process key requests in certain embodiments. The key request providing approval, denial, or cancel functionality involves the use of two pages and auto-generated emails. Only one key request can exist for a particular application, web service, and environment combination. A state change to completed, failed, or denied will open that combination for another key request in certain embodiments. A key request can exist as state=Pending for an indefinite period of time. The security administrator and/or security delegate role (or the business operations of the provisioning service datacenter 104 role in one version of the operational console) processes the request for it to move to another state in certain embodiments.

Using the key request approval, if the requestor is an application administrator role and the request is made for a key, in one embodiment, the request will be auto-approved. If the requestor is a security administrator and/or security delegate role, the request will be auto-approved regardless of environment in certain embodiments. In the case of auto-approval, Justification will be "auto-approved key request from <requestor name>".

Once a key request is approved or auto-approved, its state will change to Pending User in certain embodiments. The key resolution date/time can be entered. The key request can be cancelled by the security administrator and/or the security delegate role or requestor: resolution date/time=cancellation date/time. A key request can only be denied by the security administrator and/or security delegate role and only within the key request details page. A key request, once approved or auto-approved, can be cancelled by the security administrator and/or security delegate role while in the pending user state 506. If a request is cancelled its state changes to the failed state 512 and the state cannot be altered. This feature is available to those security administrator and/or security delegate roles wishing to cancel application administrator role key requests only on the key request details page. Once a key request is cancelled from the key request details page, the resolution should be set to "cancelled".

In one version, a key request management page is accessible by anyone in the application administrator role, the security administrator role, and/or the security delegate role. In another version, this key request management page is accessible by personnel whom are able to view the operations portal. This key request management page allows the partner site operator to review past and pending key requests for a particular provisioning service datacenter site ID. Any processed request listed may be selected for further review on the key request details page.

The page contains a list, sorted by request date/time, of past and pending key requests for a particular provisioning service datacenter site ID in certain embodiments. Columns are included for provisioning service datacenter site ID, service, environment, request date/time, resolution (pending if not processed and approved or denied if processed), and resolution date/time. Resolution is used to sort key requests into separate sections on the page. The resolution value corresponds to the state of the key request record as indicated in Table 3. When the resolution changes, the state should change accordingly. Similarly if processing causes state to change, the resolution should be updated accordingly. A full view or a view containing a subset of key requests may be selected by the partner site operator system.

TABLE 3

Relationship Between Resolution Value and State

| Resolution | State |
| --- | --- |
| Pending | Pending |
| Approved | Pending User |
| Denied | Denied |
| Cancelled | Failed |

In one embodiment, a security administrator role and/or the security delegate role may select any unprocessed key request for further review by selecting the view request. In another embodiment these details are viewable through the operations portal. A security administrator, a security delegate, or an application administrator role may review any processed request by clicking the show details link to the right of the corresponding request.

A key request details page is accessible by anyone in the application administrator role, the security administrator role, and/or the security delegate role as well as a couple roles within the operational portal. The key request details page is read-only to those other than partner site operator systems acting in the security administrator role and/or security delegate role. The partner site operator system can review the details of a particular key request. The key request details page should be accessible only from the key request management page.

The key request details page is service specific due to the differing key requirements of the different services. Once a key request is approved via the key request details page, the appropriate email is auto-generated and sent, and the database is updated.

The key request details page shows a variety of page functionality including but not limited to provisioning service datacenter/web service datacenter site ID, requestor name, request date/time, download permission (if key is shared, rendered for certain web service datacenters 106 keys only), root site ID (if key is shared), resolution=pending, approved, or denied, a resolution date and time, and justification.

Some partner sites 102 have requirements to control the proliferation of their shared keys in certain embodiments. To support this security, the security administrator and/or the security delegate role may opt to prevent the download of the key. If the key is a shared key the security administrator and/or the security delegate role will also be required to indicate whether the shared key may be downloaded by the requestor in certain embodiments. This indication will be provided by the shared key download permission field.

Emails relating to the key request results might be sent only when an application administrator role is the key requestor in certain embodiments. Different versions of the key request results email may be sent, depending on the particular result. In many versions, a copy of the email is saved.

An email is automatically created and sent to security administrator and/or the security delegate roles in certain versions. This email will contain text similar to as shown in code portion 1.

Code Portion 1: Exemplary Email Portion

A request for a <new/current version> <environment> <service> <windows/non-windows> key has been approved by <security administrator and/or security delegate role partner site operator name> for Application <Application name> within site <site ID> on <resolution date/time>.

The key requester, <application administrator role partner site operator name>, has been sent a secure key download email to facilitate the download process. Only <application administrator role partner site operator name> as the key requester, has permission to download the key. The download takes place within some prescribed period of request approval, and may only be done once in certain embodiments.

The email for a shared key approval will be identical to that for single keys. If the security administrator and/or security delegate role does not allow key download, an email is automatically created and sent to the partner site operator that made the key request and communicates to the security administrator and/or the security delegate roles. This email will contain text similar to the code portion 2:

Code Portion 2:

A request for a <new/current version> <environment> <service> <windows/non-windows> key has been approved by <security administrator and/or security delegate role partner site operator name> for application <Application name> within site <site ID> on <resolution date/time> in certain embodiments.

The approval was for a shared key, and the security administrator and/or security delegate role has chosen to assume responsibility for providing access to the key as she/he deems appropriate in certain embodiments.

The key requestor, <application administrator role partner site operator name>, should contact the security administrator role for further instructions on key access in certain embodiments.

If any key is denied, an email is automatically created and sent to the partner site operator that made the key request and communicate to the security administrator and/or the security delegate roles. Certain embodiments of this email will contain text similar to the Code Portion 3.

Code Portion 3

A request for a <new/current version> <environment> <service> <windows/non-windows> key has been denied by <security administrator and/or security delegate role partner site operator name> for application <Application name> within site <site ID> on <resolution date/time>.

For database inserts, schema changes may be necessary to capture this information. When a key request is submitted, the database is updated with for example the following key request results information: site ID, requestor name, request date/time, key type=shared or single, download permission (if key is shared), root site ID (if key is shared), key resolution date/time, justification, and state.

When a key is requested, an email containing a hash-link to the key download site is automatically created and sent to the partner site operator system that made the key request when a key request is approved for a single key or for a shared key where the security administrator and/or the security delegate role has given permission for download in certain embodiments. This email is as per the web service datacenters 106 network services manager specification. In certain embodiments, the recipient of the email has a prescribed timeout duration (e.g., 72 hours) from the time the email was sent to visit the key download page. If the timeout duration is reached, the key request state should change to "failed". The resolution changes to "cancelled" and key download failed. A timeout is appended to the justification field.

Computer Environment

Figure 8:
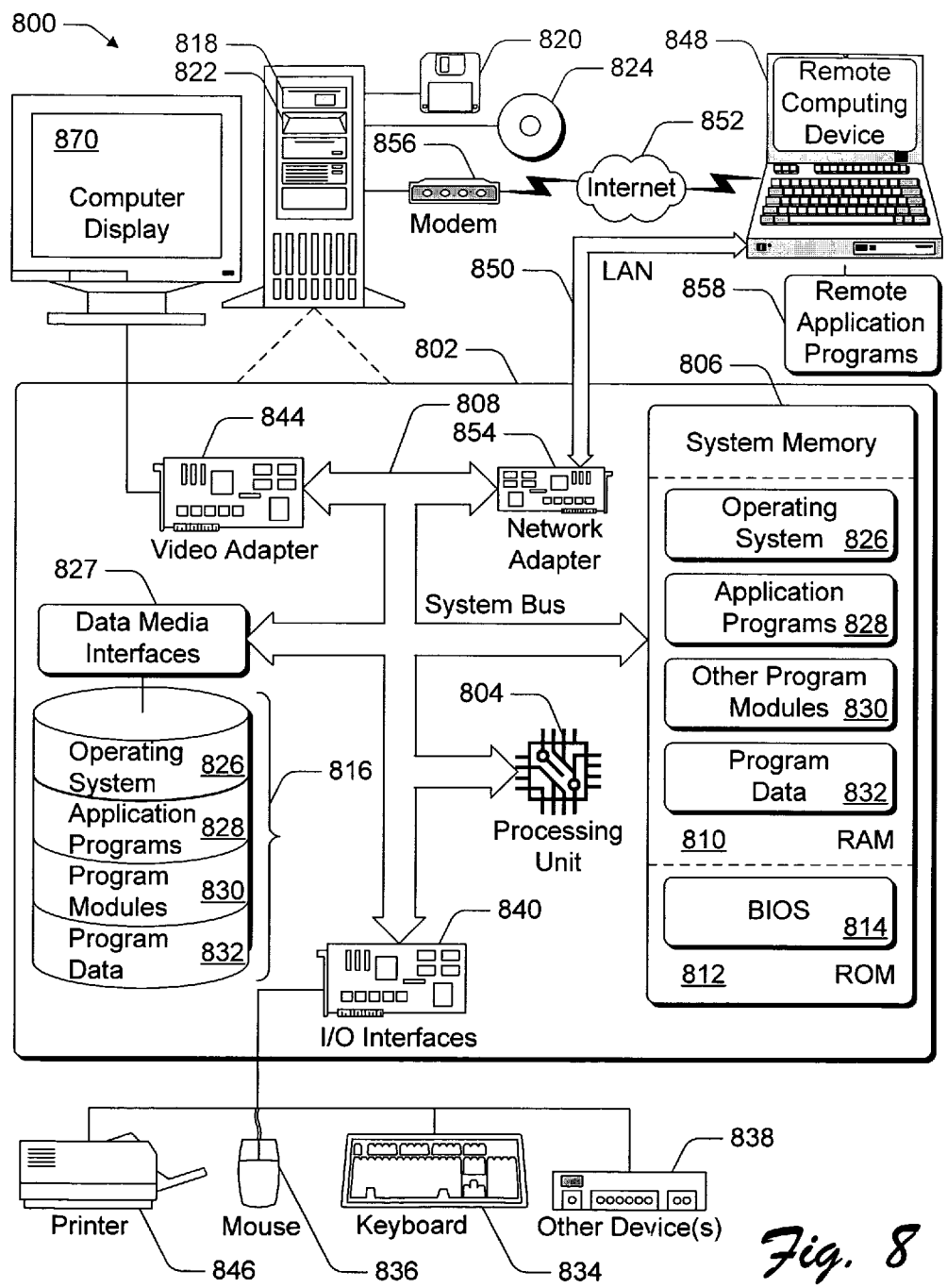
FIG. 8 is an exemplary computer environment that can run the key transfer process of FIG. 4.

FIG. 8 illustrates an example of a suitable computer environment or network 800 that includes a user interface which can provide a variety of embodiments such as can be used for each one of the provisioning service datacenter 104, the web service datacenter 106, and/or the partner site 102. Similar resources may use the computer environment and the processes as described herein.

The computer environment 800 illustrated in FIG. 8 is a general computer environment, which can be used to implement the concept network techniques described herein. The computer environment can be considered as an embodiment of the embodiments of the computer embodiment 20 described above relative to FIGS. 1 and 8. The computer environment 800 is only one example of a computer environment and is not intended to suggest any limitation as to the scope of use or functionality of the computer and network architectures. Neither should the computer environment 800 be interpreted as having any dependency or requirement relating to any one or combination of components illustrated in the exemplary computer environment 800.

The computer environment 800 includes a general-purpose computing device in the form of a computer 802. The computer 802 can be, for example, one or more of a stand alone computer, a networked computer, a mainframe computer, a PDA, a telephone, a microcomputer or microprocessor, or any other computer device that uses a processor in combination with a memory. Wireless and wired devices may be included in certain portions of the computer environment such as are generally known and widely used for networking technologies. The components of the computer 802 can include, but are not limited to, one or more processors or processing units 804 (optionally including a cryptographic processor or co-processor), a system memory 806, and a system bus 808 that couples various system components including the processor 804 and the system memory 806.

The system bus 808 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The computer 802 can include a variety of computer readable media. Such media can be any available media that is accessible by the computer 802 and includes both volatile and non-volatile media, and removable and non-removable media.

The system memory 806 includes the computer readable media in the form of non-volatile memory such as read only memory (ROM) 812, and/or volatile memory such as random access memory (RAM) 810. A basic input/output system (BIOS) 814, containing the basic routines that help to transfer information between elements within the computer 802, such as during start-up, is stored in the ROM 812. The RAM 810 can contain data and/or program modules that are immediately accessible to, and/or presently operated on, by the processing unit 804.

The computer 802 may also include other removable/non-removable, volatile/non-volatile computer storage media. By way of example, FIG. 8 illustrates a hard disk drive (not shown) for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive, magnetic disk drive 818, and optical disk drive 822 are each connected to the system bus 808 by one or more data media interfaces 827. Alternatively, the hard disk drive, magnetic disk drive 818, and optical disk drive 822 can be connected to the system bus 808 by one or more interfaces (not shown).

The disk drives and their associated computer-readable media provide non-volatile storage of computer readable instructions, control node data structures, program modules, and other data for the computer 802. Although the example illustrates a hard disk within the hard disk drive 815, a removable magnetic disk 820, and a non-volatile optical disk 824, it is to be appreciated that other types of the computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computer environment 800.

Any number of program modules can be stored on the hard disk contained in the hard disk drive, magnetic disk 820, non-volatile optical disk 824, ROM 812, and/or RAM 810, including by way of example, the OS 826, one or more application programs 828, other program modules 830, and program data 832. Each OS 826, one or more application programs 828, other program modules 830, and program data 832 (or some combination thereof) may implement all or part of the resident components that support the distributed file system.

A partner site operator or a consumer can enter commands and information into their respective computer 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor, flat panel display, or other type of computer display 870 can also be connected to the system bus 808 via an interface, such as a video adapter 844. In addition to the computer display 870, other output peripheral devices can include components such as speakers (not shown) and a printer 846 which can be connected to the computer 802 via the input/output interfaces 840.

The computer 802 can operate in a networked environment using logical connections to one or more remote computers, such as a remote computer device 848. By way of example, the remote computer device 848 can be a personal computer, portable computer, a server, a router, a network computer, a peer device or other common network node, game console, and the like. The remote computer device 848 is illustrated as a portable computer that can include many or all of the elements and features described herein relative to the computer 802.

Logical connections between the computer 802 and the remote computer device 848 are depicted as a local area network (LAN) 850 and a general wide area network (WAN) 852. Such networking environments are commonplace in offices, enterprise-wide computer networks, intranets, and the Internet.

When implemented in a LAN networking environment, the computer 802 is connected to a local network 850 via a network interface or adapter 854. When implemented in a WAN networking environment, the computer 802 can includes a modem 856 or other means for establishing communications over the wide network 852. The modem 856, which can be internal or external to the computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with the computer environment 800, program modules depicted relative to the computer 802, or portions thereof, may be stored in a remote memory storage device. By way of example, remote application programs 858 reside on a memory device of the remote computer 848. For purposes of illustration, application programs and other executable program components such as the operating system are illustrated herein as discrete web blocks, although it is recognized that such programs and components reside at various times in different storage components of the computer 802, and are executed by the data processor(s) of the computer 802. It will be appreciated that the network connections shown and described are exemplary and other means of establishing a communications link between the computers may be used.

Various modules and techniques may be described herein in the general context of the computer-executable instructions, such as program modules, executed by one or more computers or other devices. Generally, program modules include routines, programs, control objects 550, components, control node data structures 554, etc. that perform particular tasks or implement particular abstract data types. Often, the functionality of the program modules may be combined or distributed as desired in various embodiments.

An implementation of these modules and techniques may be stored on or transmitted across some form of the computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any process or technology for storage of information such as computer readable instructions, control node data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The term "communication media" includes, but is not limited to, computer readable instructions, control node data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Exemplary Scenarios for Automated Secure Key Distribution System

The following portion provides a variety of embodiments of the scenarios of use for the different embodiments of the automated secure key distribution system 100 as shown in FIGS. 1, 2, and 3, and described in this disclosure. These scenarios are illustrative in nature, and are not intended to be limiting in scope. The names of individuals are intended to clarify the description, and are indicative of their particular roles. These scenarios are each described in a separate paragraph.

One embodiment of a key request and approval for a web service shared key by an application administrator (where the security administrator and/or the security delegate role elects to approve the key request but decline download permission). The following is meant to demonstrate one embodiment of the workflow of the production key request process.

1. Bob, an application administrator, is working with an application that contains one web service.
2. Bob rolls the application into production for the web service.
3. Bob next visits the key request page. He picks "current version" of a key from the options presented on the page, and selects "request key".
4. This triggers a back-end process that:
    4.1. Stores the key request information in the database.
    4.2. Executes the shared key determination process.
5. An auto-generated email is sent to the security administrator and/or security delegate roles for the partner site Bob is working with. Bob, the application administrator that made the key request, communicates with. This email informs of the production key request from Bob and includes a link to the key request management page.
6. Alice, who is one of the two security administrator and/or security delegates for the partner site, opens the email and clicks the link to the key request management page.
    6.1. Alice belongs to the security administrator and/or security delegate role, and so she has update permissions to this page. Bob, as application administrator, has read-only access to the page.
    6.2. On this page Alice can see past and pending key requests for those sites for which she has permissions.
    6.3. The key request management page shows summary information for the key request, and Alice selects the one with the partner site ID, web service, and environment that match the information in the email she received. She can view the request to see the details of that request.
7. On the key request details page Alice enters the justification for the request in the multi-line text box designed for that purpose.
    7.1. This is a request for a key that the shared key determination system has established as shared. Text stating that the key is shared is displayed to Alice. The fact that this is a shared key causes another control, "shared key download permission", to become visible. Alice does not want Bob to download a copy of the shared key through the provisioning service datacenter, she wants one of the security administrator and/or security delegates to provide access for it. Thus Alice selects this option.
    7.2. Finally, Alice clicks "Approved".
8. An auto-generated email is sent to Bob, and communicates with to the security administrator and/or security delegates. This email advises that the key request was approved, that the correct key Type is a shared key, and that Bob should contact Alice directly to gain access to the key.
9. Bob contacts Alice to determine the correct procedure for his using this shared key on his site.

One embodiment of a key request being processed from the shared key queue scenario is now described. The following is meant to demonstrate the workflow of the shared key determination process. This process is applied to the web service key requests from one version.

1. Before being placed in the shared key queue, the key requests are checked by, for example, considering the value of the shared key flag for the application ID. If the shared key flag equals 0 or 1, the request is placed in the shared key queue.
2. Dawn, who is not a security administrator and/or security delegate, checks the shared key queue on a regular basis to process any web service key requests that the shared key determination system flags as possible shared keys.
3. Dawn sees a key request in the queue and reviews it. If Dawn determines that the key request should be for a shared key she will assign the correct root site ID to the request. This sets the shared key flag to 2. If Dawn determines that the key request should be for a single key she indicates this. This sets the shared key flag to 3.
    3.1. For both shared and single keys, a manual determination is made and indicated on the record in the shared key flag. This means that future key requests for any application ID processed in the shared key queue will not return to this queue.

One embodiment of a key request and approval scenario for a web key by an application administrator, which is then cancelled by the security administrator and/or the security delegate role. The following is meant to demonstrate one embodiment of the workflow of the key request process for this scenario.

1. Bob, an application administrator, is working with an application that contains the web services.
2. Bob rolls the application into production for one web service.
3. Bob next visits the key request page. He picks a new version of a key from the options presented on the page, and requests the key.
4. This request triggers a back-end process that stores key request information in the database.
5. An auto-generated email is sent to the security administrators and/or security delegates for the partner site Bob is working with, and communicates with to Bob, the application administrator that made the key request. This email informs of the production key request from Bob and includes a link to the key request management page.

6. Alice, who is one of the two security administrators and/or security delegates for the partner site, opens the email and clicks the link to the key request management page.
  6.1. Alice belongs to the security administrator and/or security delegate role, and so she has update permissions to this page. Bob, as application administrator, has read-only access to the page.
  6.2. On this page Alice can see the past and pending key requests for the partner sites for which she has permissions.
  6.3. The key request management page shows summary information for the key requests, and Alice selects the one with the partner site ID, web service, and environment that match the information in the email she received. She views the request to see the details of that request on the key request details page.
7. On the key request details page Alice enters the justification for the request in the multi-line text box designed for that purpose. Alice then clicks "approved".
8. An auto-generated email is sent to the security administrator and/or security delegates. This email advises that the key request was approved. The email also states that a secure key Download email has been sent to Bob, to facilitate the key download process. A link is also provided to the key request management page.
9. Unfortunately Bob has become ill, is staying home for a few days. This means he is not able to receive the secure key download email and use it to start the key download process in a timely manner.
10. Alice is informed of this and decides to cancel Bob's approved key request so someone else can perform the download.
11. Alice goes to the key management page and finds Bob's key request as she did when approving it. Alice cancels this request. This action changes the state of the request to allow another key request to be started.

One embodiment of a key request and denial for a web service single key by an application administrator scenario is now described. The following is meant to demonstrate one embodiment of the workflow of the key request process.
 1. Bob, an application administrator, is working with an application that contains a plurality of web services.
 2. Bob rolls the application into production for the first web service.
 3. Bob next visits the key request page. He picks the current version of a non-key from the options presented on the page, and requests the key.
 4. This triggers a back-end process that:
  4.1. stores key request information in the database.
  4.2. executes the shared key determination process.
 5. An auto-generated email is sent to the security administrator and/or security delegates for the partner site that Bob is working with. The partner site communicates with Bob, the application administrator that made the key request. This email informs of the production key request from Bob and includes a link to the key request management page.
 6. Alice, who is one of the two security administrator and/or security delegates for the partner site, opens the email and clicks the link to the key request management page.
  6.1. Alice belongs to the security administrator and/or security delegate role, and so she has update permissions to this page. Bob, as application administrator, has read-only access to the page.
  6.2. On this page Alice can see the past and pending key requests for the partner sites for which she has permissions.
  6.3. The key request management page shows summary information for the key requests, and Alice selects the one with the partner site ID, web service, and environment that match the information in the email she received. She views the request to see the details of that request on the key request details page.
 7. This is a request for a key that the shared key determination system has established as single. Displayed text to Alice states that the key is single.
 8. Alice does not want the key to be downloaded at this time. On the key request details page Alice enters the justification for denying request in the multi-line text box designed for that purpose. She then clicks "Denied".
 9. An auto-generated email is sent to Bob, and communicates with to the security administrator and/or security delegates. This email advises that the key request was denied. A link is also provided to the key request management page so Bob can review the justification for key request denial.
10. Bob clicks the link and opens the key request management page.
  10.1. Bob can see the past and pending key requests for every key request within his jurisdiction.
  10.2. The key request management page shows summary information for the key requests, and Bob selects the one marked "denied" that match the date/time he made the request. He views the details to see the details of that request on the key request details page.
  10.3. Bob reads the justification for denying his key request and may opt to contact Alice directly to find out more information on his key request, such as when a new key request may be approved.
11. Bob contacts Alice to discover additional information on when he may download a key. Both Alice and Bob are aware that the provisioning service datacenter are not involved in key request approval/denial, and it is the responsibility of the security administrator and/or security delegate to process the key requests.

One embodiment of a key request and auto-approval for a web service single key by a security administrator and/or security delegate, with an error during download scenario is now described. The following is meant to demonstrate one embodiment of the workflow of the key request process.
 1. Alice, who is a security administrator and/or security delegate, has decided to download a Passport production key for an application that contains web services.
 2. Alice visits the key request page. She picks "current version" of a key from the options presented on the page, and clicks "request key".
 3. This triggers a back-end process that:
  3.1. stores key request information in the database.
  3.2. executes the shared key determination process.
 4. An auto-generated email is sent to the security administrator and/or security delegates for the application. This email indicates the production key request from Alice and includes a link to the key request management page. This email also indicates that the key request was auto-approved and that a secure key download email has been sent to Alice to facilitate the key download process.

5. Alice will use the secure key download email to start the key download process, as she is familiar with doing in the provisioning service datacenter.
6. When Alice is presented with the file download dialog, she accidentally opens the file instead of save. Alice realizes her mistake and cancels the operation. She then indicates she was unsuccessful in downloading the key on the key download confirmation page.
7. Because she has not reached her maximum of two download attempts, Alice is allowed to download the key again. This time she successfully saves the file to a file share, and indicates her success on the key download confirmation page.

One embodiment of a key request and auto-approval for a web service single key by an application administrator scenario is now described. The following is meant to demonstrate one embodiment of the workflow of the key request process.

1. Bob is an application administrator who is provisioning a pre-production application that contains a key for the web services.
2. Bob visits the key request page. He selects the key to be requested from the options presented on the page.
3. This triggers a back-end process that:
   3.1. stores key request information in the database.
   3.2. executes the shared key determination process
4. An auto-generated email is sent to the security administrator and/or security delegates for the application. This email indicates the pre-production key request from Bob and includes a link to the key request management page. This email also indicates that the key request was auto-approved and that a secure key download email has been sent to Bob to facilitate the key download process.
5. Bob will use the secure key download email to start the key download process.

One embodiment of a key request and subsequent cancellation by an application administrator is now described. The following is meant to demonstrate one embodiment of the workflow of the key request process.

1. Bob is an application administrator who is provisioning an application that contains the key for a web services.
2. Bob visits the key request page. He selects the key from the options presented on the page, and requests the key.
3. This triggers a back-end process that:
   3.1. Stores key request information in the database.
   3.2. Executes the shared key determination process (see scenario 2 for details).
4. An auto-generated email is sent to the security administrator and/or security delegates for the Application. This email indicates the pre-production key request from Bob and includes a link to the key request management page. This email also indicates that the key request was auto-approved and that a secure key download email has been sent to Bob to facilitate the key download process.
5. Bob realizes that he is going to be away on business and will not be able to complete the download process. In order to open the application up to another application administrator, security administrator and/or security delegate to download a key, decides to cancel his key request.
6. To accomplish the cancellation, Bob revisits the key request page for the pre-production Passport application for which he made his original key request. Bob selects "Cancel Request" on this page.

Because Bob cancelled the key request, the secure key download email that was sent to him will no longer allow him to download a key.

There are a large number of additional and modified scenarios that may be provided within the automated secure key distribution system 100 that are within the intended scope of the present disclosure.

CONCLUSION

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An apparatus comprising:
a provisioning service datacenter that provides a key transfer from a web service datacenter over a first secure channel in response to a hashed link, information relating to a web service is automatically provisioned using the key transferred from the provisioning service datacenter.

2. The apparatus of claim 1, comprising a corporate network.

3. The apparatus of claim 1, comprising the Internet.

4. The apparatus of claim 1, wherein the provisioning service datacenter receives a request from a partner site.

5. The apparatus of claim 4, wherein the provisioning service datacenter is associated with a security administrator role at the partner site.

6. The apparatus of claim 5, wherein the security administrator role is authorized to make a key a request.

7. The apparatus of claim 4, wherein the provisioning service datacenter is associated with a security delegate role at the partner site.

8. The apparatus of claim 7, wherein the security delegate role is authorized to make a key request.

9. The apparatus of claim 1, wherein the hashed link is transmitted from the provisioning service datacenter to a partner site.

10. The apparatus of claim 9, wherein a partner site operator at the partner site selects the hashed link to indicate the partner site operator is the person who is actually downloading.

11. A method to be performed at a provisioning service datacenter to provide a key transfer from a web service datacenter, the method comprising:
receiving from the provisioning service datacenter a request to download a key from the web service datacenter;
transmitting the key over a secure link from the web service datacenter through the provisioning service datacenter in response to a hashed link; and
receiving an indication of activation of the secure transfer.

12. The method of claim 11, further comprising:
requesting a key transfer at a partner site from the provisioning service datacenter to the partner site;
automatically provisioning a first secure channel from the web service datacenter to a partner site over a first secure channel via a provisioning service datacenter; and
transferring a key from the provisioning service datacenter to the partner site over the secure channel.

13. The method of claim 12, further comprising:
establishing a second secure channel between the partner site and a consumer; and
providing information relating to a web service over the second secure channel to the consumer.

14. The method of claim 11, further comprising receiving at the provisioning service a request from a partner site.

15. The method of claim 11, further comprising expiring a key.

16. The method of claim 11, further comprising versioning a key.

17. The method of claim 11, wherein the provisioning service datacenter communicates with a security delegate role at a partner site.

18. The method of claim 17, wherein the security delegate role is authorized to make a key request.

19. The method of claim 11, wherein the provisioning service datacenter communicates with a security administrator role at a partner site.

20. The method of claim 19, wherein the security administrator role is authorized to make a key request.

21. The method of claim 11, wherein the hashed link is transmitted via an e-mail from the provisioning service datacenter to a partner site.

22. A computer readable storage medium having computer executable instructions, which when executed by a processor, causes the processor to:
request a key transfer from a web service datacenter using a provisioning service datacenter;
automatically provision a first secure channel from the web service datacenter; and
transfer a key from the web service datacenter over the secure channel in response to a hashed link.

23. The computer executable instructions of claim 22, further comprising:
establishing a second secure channel between a partner site and a consumer; and
providing information relating to a provisioning service over the second secure channel to the consumer.

24. The computer executable instructions of claim 22, further comprising receiving at the provisioning service a request from the partner site.

25. The computer executable instructions of claim 22, wherein the provisioning service datacenter is associated with a security administrator role that is authorized to make a key request.

26. The computer executable instructions of claim 22, wherein the provisioning service datacenter is associated with a security delegate role that is authorized to make a key request.

27. The computer executable instructions of claim 22, wherein the hashed link is transmitted via an e-mail from the provisioning service datacenter to the partner site.

28. A provisioning service datacenter, the provisioning service datacenter including:
a key transfer portion for establishing a secure channel from a provisioning service datacenter over which a key can be transferred;
the provisioning service datacenter configured to send a hashed email wherein the key transfer is provided in response to the hashed email;
a site interface;
a middle tier portion in communication with the site interface; and
a database portion in communication with the middle tier, the database portion capable of storing information from the sites relating to the key transfer.

29. The provisioning service datacenter of claim 28, wherein the database portion includes a configuration database.

30. The provisioning service datacenter of claim 28, wherein the database portion includes a read database.

31. The provisioning service datacenter of claim 28, wherein the database portion includes a write database.

32. The provisioning service datacenter of claim 28, further comprising:
a service connector; and
a service handler in communications with the service connector, wherein the provisioning datacenter is in communication with the service connector, and the service handler is in communications with the web service datacenter.

33. The provisioning service datacenter of claim 28, further comprising:
an operations portion; and
an operation portal in communication with the operations portion, wherein the database portion is in communication with the service connector.

34. A method comprising:
receiving a key request at a web service datacenter that was automatically generated in response to an email having a hashed link sent from a provisioning service datacenter; and
transmitting the key from the web service datacenter in response to the hashed link, where the key lands at a landing page which has been configured for key download.

35. The method of claim 34, wherein the key request is generated by a partner site.

36. The method of claim 34, wherein the key is transmitted to a partner site.

37. The method of claim 34, wherein the key is expired.

38. The method of claim 34, wherein the key is versioned.

39. A method comprising:
receiving a hashed email at a provisioning service datacenter;
automatically transmitting data from the provisioning service datacenter to a web service datacenter in response to the hashed email;
automatically logging into the web service datacenter from the provisioning service datacenter using a secure link;
downloading a key from the web service datacenter to install on a partner site; and
transmitting the key over the secure link from the web service datacenter through the provisioning service datacenter in response to the hashed email.

40. The method of claim 39, further comprising comparing a request domain name within the received request against a stored domain name stored in a table, the table being contained within the provisioning service datacenter, wherein if the request domain name matches the stored domain name, then the request is applied to a shared key queue.

41. The method of claim 39, wherein the key that is downloaded from the web service datacenter to install on the partner site is downloaded via the provisioning service datacenter.

42. The method of claim 39, further comprising:
logging in at the partner site to the web service;
requesting at the partner site a key download from the provisioning service datacenter; and
sending an email with a hashed link from a provisioning service datacenter to the partner site.

43. An apparatus comprising:

a provisioning service datacenter that provides a key transfer from a web service datacenter over a first secure channel in response to a hashed link, the hashed link including request identifier information, wherein information relating to a web service is automatically provisioned using the key transferred from the provisioning service datacenter; and a shared key queue guessing portion associated with the provisioning service datacenter, wherein when the shared key queue receives the received request the request identifier information is compared against provisioning identifier information contained within the provisioning service datacenter.

44. The apparatus of claim 43, wherein the request identifier information and the provisioning identifier information both include a domain name.

45. The apparatus of claim 43, wherein the provisioning identifier information is maintained in a table.

46. The apparatus of claim 43, wherein if the request identifier information matches against the provisioning identifier information, then the request is applied to a shared key queue for a role.

47. The apparatus of claim 43, wherein if the request identifier information matches against the provisioning identifier information, then the request can be viewed at a partner site.

48. The apparatus of claim 43, wherein if the request identifier information matches against the provisioning identifier information, then a key is returned to the provision service datacenter.

49. The apparatus of claim 48, further comprising determining whether the key is a shared key.

* * * * *